(12) United States Patent
Tahara

(10) Patent No.: US 12,413,683 B2
(45) Date of Patent: Sep. 9, 2025

(54) ILLUMINATION APPARATUS, ILLUMINATION METHOD, AND PROJECTOR APPARATUS

(71) Applicant: SONY GROUP CORPORATION, Tokyo (JP)

(72) Inventor: Hiroyuki Tahara, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 350 days.

(21) Appl. No.: 17/924,199

(22) PCT Filed: Mar. 25, 2021

(86) PCT No.: PCT/JP2021/012611
§ 371 (c)(1),
(2) Date: Nov. 9, 2022

(87) PCT Pub. No.: WO2021/235085
PCT Pub. Date: Nov. 25, 2021

(65) Prior Publication Data
US 2023/0319228 A1 Oct. 5, 2023

(30) Foreign Application Priority Data
May 18, 2020 (JP) .............................. 2020-086878

(51) Int. Cl.
*H04N 5/74* (2006.01)
(52) U.S. Cl.
CPC ......... *H04N 5/7441* (2013.01); *H04N 5/7458* (2013.01); *H04N 5/7475* (2013.01); *H04N 2005/745* (2013.01)

(58) Field of Classification Search
CPC .... H04N 9/315; H04N 9/3105; H04N 9/3108; H04N 9/3111; H04N 9/3114;
(Continued)

(56) References Cited

U.S. PATENT DOCUMENTS

2008/0247010 A1 10/2008 Ogasawara
2015/0009695 A1 1/2015 Christmas
(Continued)

FOREIGN PATENT DOCUMENTS

CN 106500036 A 3/2017
CN 106662739 A 5/2017
(Continued)

OTHER PUBLICATIONS

International Search Report and Written Opinion prepared by the Japan Patent Office on May 6, 2021, for International Application No. PCT/JP2021/012611, 2 pgs.

*Primary Examiner* — Sultan Chowdhury
(74) *Attorney, Agent, or Firm* — Sheridan Ross PC

(57) ABSTRACT

Provided by the present technology is an illumination apparatus including a light source section, a phase modulation section, and a control section. The light source section has a light emitting element. The phase modulation section performs spatial light phase modulation on incident light from the light source section. The control section controls the phase modulation section in such a manner that a plurality of domains formed by dividing a phase modulation plane of the phase modulation section reproduces a light intensity distribution based on a common phase distribution determined on the basis of a Freeform method in a common region on a projection plane.

17 Claims, 17 Drawing Sheets

(58) Field of Classification Search
CPC .. H04N 9/3123; H04N 9/3126; H04N 9/3152; H04N 9/3155; H04N 9/3161; H04N 9/3164; H04N 9/3182; H04N 9/3188; H04N 9/3194; H04N 5/7441; H04N 5/7458; H04N 5/7475; H04N 2005/745; G03B 21/005; G03B 21/006; G03B 21/008; G03B 21/28; G03B 21/208; G03B 21/2013; G03B 21/2033; F21S 41/153; F21S 41/645; F21S 41/675; H05B 47/10; G02F 2203/12; G02F 2203/50

See application file for complete search history.

(56) References Cited

U.S. PATENT DOCUMENTS

| | | | |
|---|---|---|---|
| 2017/0085846 A1* | 3/2017 | Damberg | H04N 9/3167 |
| 2017/0363869 A1 | 12/2017 | Christmas | |
| 2018/0173082 A1 | 6/2018 | Okumura | |
| 2020/0241473 A1* | 7/2020 | Cooney | G03H 1/02 |
| 2020/0363772 A1* | 11/2020 | Popov | G03H 1/2286 |
| 2021/0072379 A1* | 3/2021 | Christmas | G01S 7/4863 |
| 2021/0223738 A1* | 7/2021 | Futterer | G03H 1/268 |

FOREIGN PATENT DOCUMENTS

| | | |
|---|---|---|
| CN | 106796355 A | 5/2017 |
| CN | 110286484 A | 9/2019 |
| JP | 2005345904 A | 12/2005 |
| JP | 2016-133668 | 7/2016 |
| JP | 2017-520022 | 7/2017 |
| JP | 2017532583 A | 11/2017 |
| WO | WO-2013117923 A1 | 8/2013 |
| WO | WO-2016098281 A1 | 6/2016 |
| WO | WO-2016208171 A1 | 12/2016 |
| WO | WO-2019017128 A1 | 1/2019 |

* cited by examiner

PHASE DISTRIBUTION

FIG.4
A
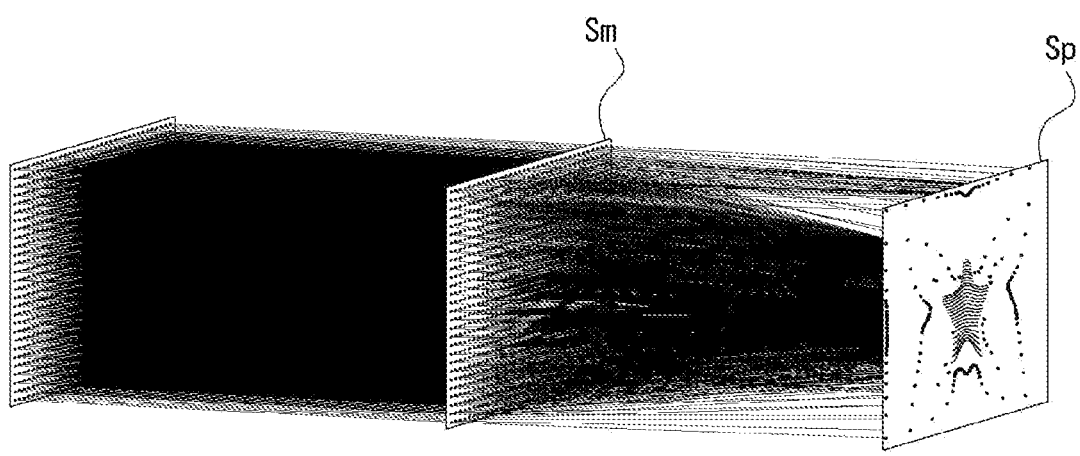
B
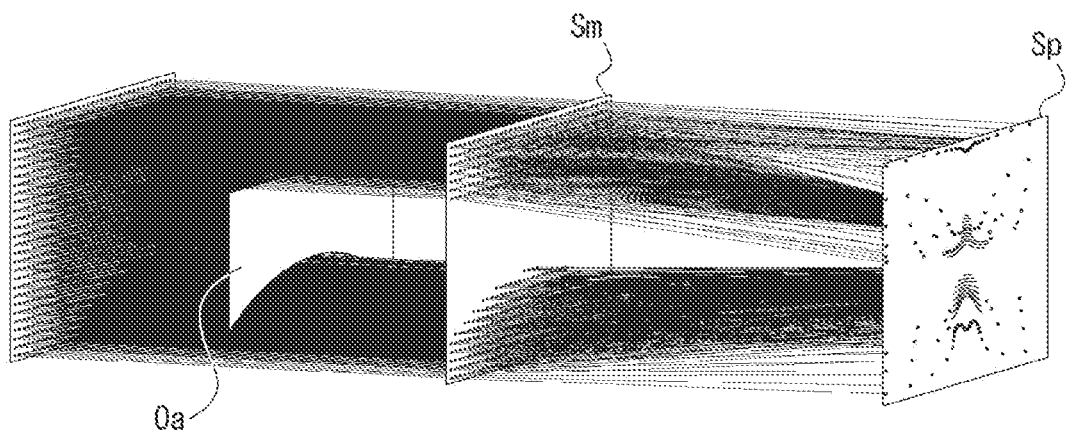

FIG.6
A
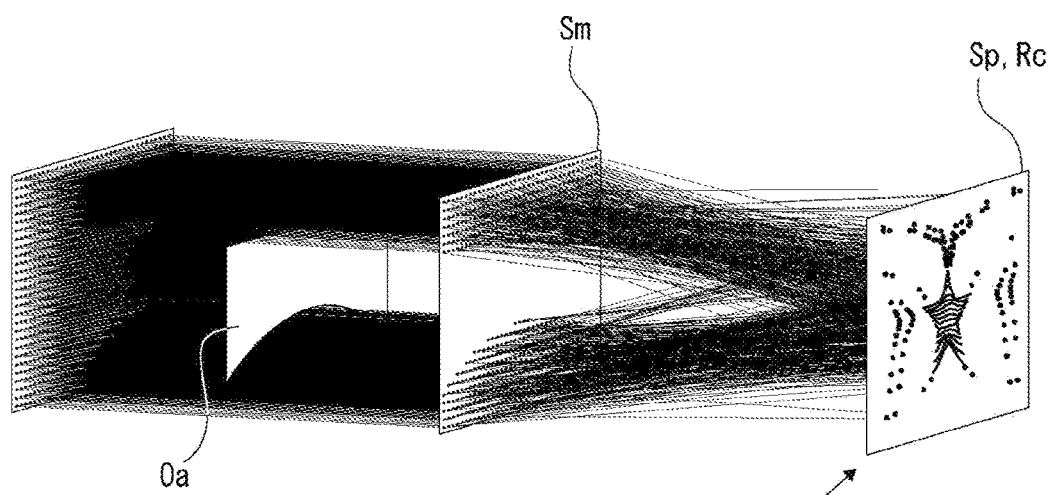
B
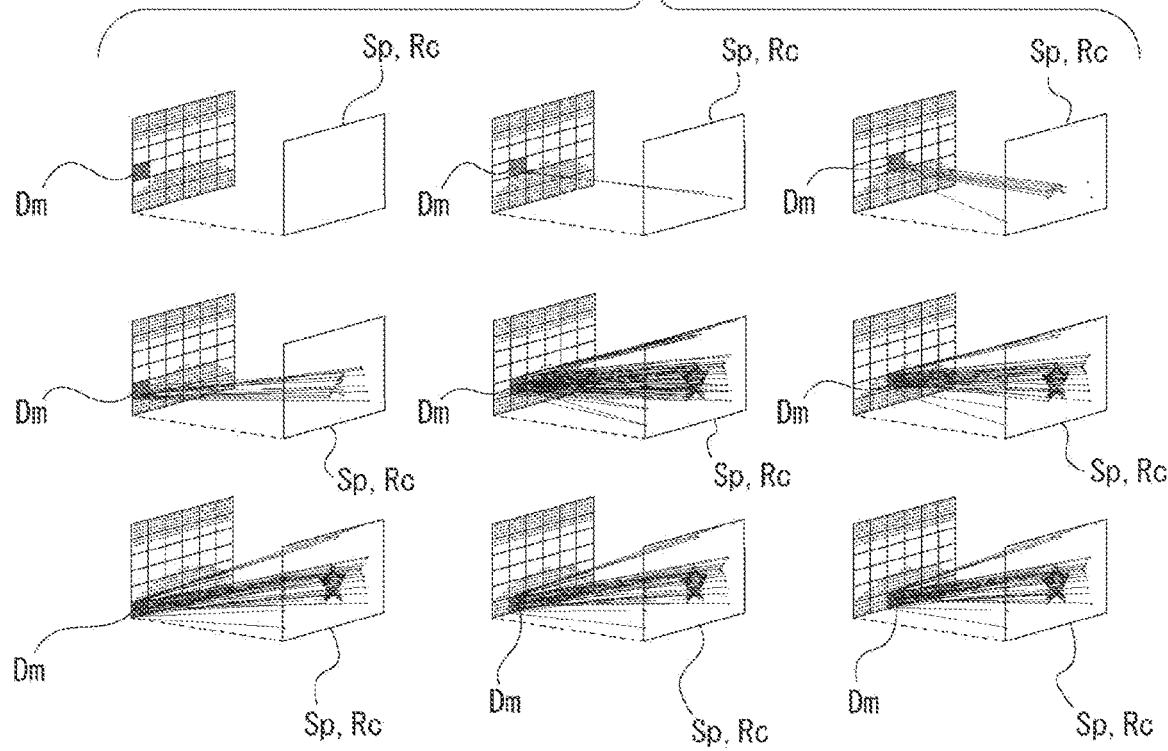

F I G. 7
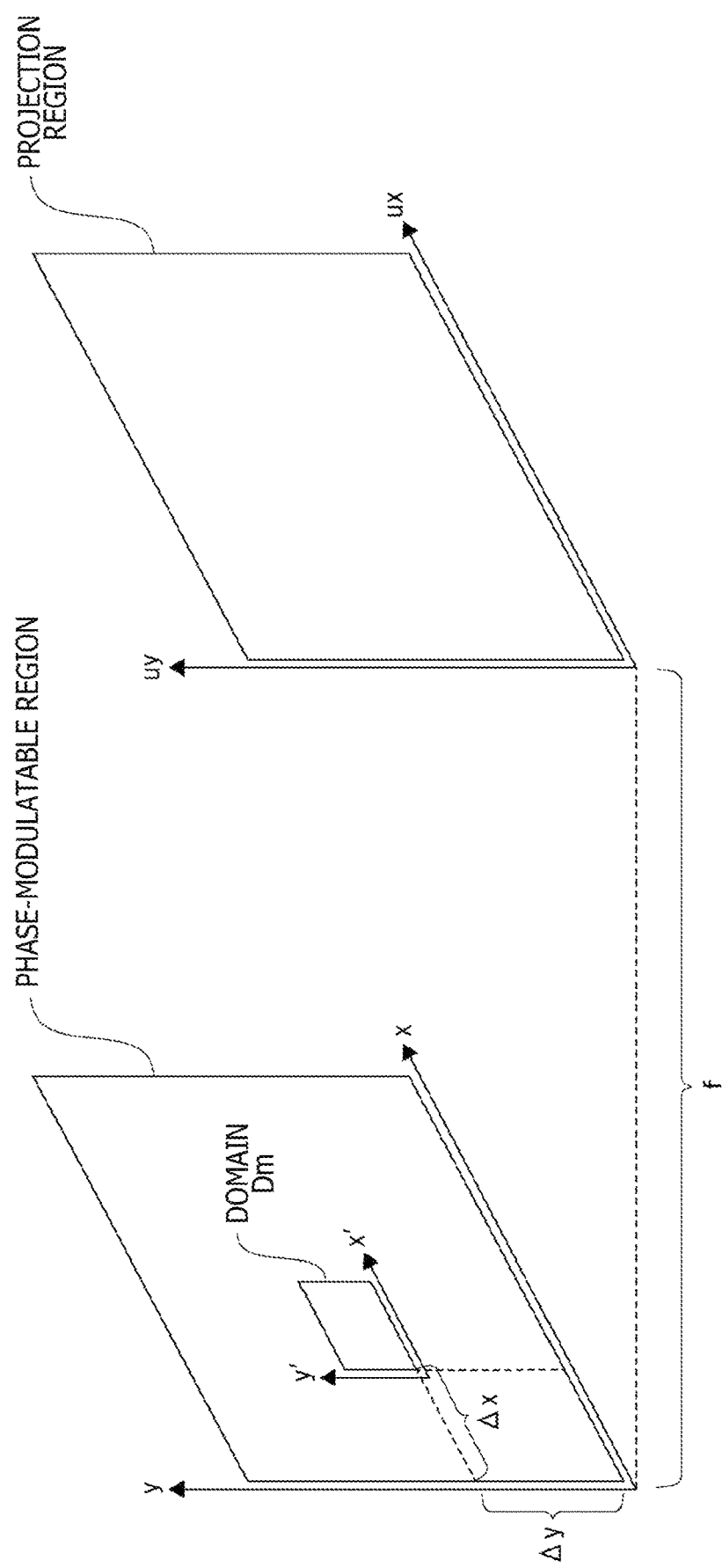

ILLUMINATION APPARATUS, ILLUMINATION METHOD, AND PROJECTOR APPARATUS

CROSS REFERENCE TO RELATED APPLICATIONS

This application is a national stage application under 35 U.S.C. 371 and claims the benefit of PCT Application No. PCT/JP2021/012611, having an international filing date of Mar. 25, 2021, which designated the United States, which PCT application claimed the benefit of Japanese Patent Application No. 2020-086878, filed May 18, 2020, the entire disclosures of each of which are incorporated herein by reference.

TECHNICAL FIELD

The present technology relates to a technical field concerning an illumination apparatus for reproducing a desired image by performing spatial light phase modulation on incident light, an illumination method performed by such an illumination apparatus, and a projector apparatus to which such an illumination apparatus is applied.

BACKGROUND ART

There is a known technology for reproducing a desired image (light intensity distribution) by performing spatial light modulation on incident light through the use of a liquid crystal panel and a spatial light modulator (SLM) such as a DMD (Digital Micromirror Device). For example, widely known is a technology for reproducing a desired image by performing spatial light intensity modulation on incident light.

Meanwhile, also known is a technology for projecting a desired reproduced image by performing spatial light phase modulation on incident light (refer, for example, to PTL 1 below). In a case where spatial light intensity modulation is performed, incident light is partially dimmed or blocked in an SLM for reproducing a desired light intensity distribution. However, in a case where spatial light phase modulation is performed, light utilization efficiency can be improved because a desired light intensity distribution can be reproduced without dimming or blocking the incident light in the SLM.

CITATION LIST

Patent Literature

[PTL 1]
JP-T-2017-520022

SUMMARY

Technical Problem

For use in the case where spatial light phase modulation is performed, a Freeform method represented by a method disclosed in PTL 1 is known as a method of determining a phase distribution for reproducing a desired image. Here, the Freeform method is a generic name for a method of determining the phase distribution for reproducing a desired image on the basis of ray optics.

However, a conventional Freeform method disclosed in PTL 1 assumes that the light intensity distribution of incident light is even (a uniform distribution in which there is no light intensity variation in an in-plane direction), and is the method of determining a phase distribution for refracting the incident light rays in such a manner that ray grid points in a whole phase modulation plane and a whole projection plane (points where a virtual light ray penetrates each plane) are connected in an optimal one-to-one relation. Therefore, if the light intensity distribution of the incident light is non-uniform, an incident light intensity distribution is superimposed on a reproduced image. Here, the optimal one-to-one relation indicates that a density distribution on the projection plane of ray grid points mapped from the phase modulation plane onto the projection plane in a one-to-one relation is as close as possible to a target intensity distribution.

The present technology has been made in view of the above circumstances. An object of the present technology is to improve robustness against an incident light intensity distribution.

Solution to Problem

An illumination apparatus according to the present technology includes a light source section, a phase modulation section, and a control section. The light source section has a light emitting element. The phase modulation section performs spatial light phase modulation on incident light from the light source section. The control section controls the phase modulation section in such a manner that a plurality of domains formed by dividing a phase modulation plane of the phase modulation section reproduces a light intensity distribution based on a common phase distribution determined on the basis of a Freeform method in a common region on a projection plane.

The Freeform method is a generic name for a method of determining a phase distribution for reproducing a desired image on the basis of ray optics. When the plurality of domains reproduces the light intensity distribution based on the common phase distribution in the common region on the projection plane as described above, the light intensity distribution reproduced in the common region represents one obtained by mering light intensity distributions by the individual domains. Therefore, even if the light intensity distribution of the incident light is uneven and non-uniform, contributions from the individual domains are averaged in the projection plane. Consequently, the light intensity distribution of the reproduced image is unlikely to change.

The above-described illumination apparatus according to the present technology may alternatively be configured such that the light source section has a plurality of light emitting elements.

This alternative configuration eliminates the necessity of using a single high-output light emitting element in the light source section in order to satisfy predetermined light intensity requirements.

The above-described illumination apparatus according to the present technology may alternatively be configured such that the control section uses, as the common phase distribution, a phase distribution that is obtained by performing a scaling process according to sizes of the domains on a phase distribution calculated by the Freeform method.

This alternative configuration eliminates the necessity of calculating the phase distribution of each domain by the Freeform method.

The above-described illumination apparatus according to the present technology may alternatively be configured such that the control section assigns, as the phase distribution of each domain, a phase distribution obtained by adding a lens component based on a domain location to the common phase distribution.

This alternative configuration makes it possible to properly reproduce a common light intensity distribution in the common region of the projection plane in a case where the common phase distribution is used for each domain.

The above-described illumination apparatus according to the present technology may alternatively be configured such that the control section dynamically changes the number of domain divisions.

Increasing the number of domain divisions improves the robustness against the incident light intensity distribution. Decreasing the number of domain divisions improves the resolution of the reproduced image.

The above-described illumination apparatus according to the present technology may alternatively be configured such that the control section changes the number of domain divisions according to the result of evaluation of uniformity of the light intensity distribution of the incident light.

This alternative configuration makes it possible to properly control the number of domain divisions according to the incident light intensity distribution. For example, in a case where the uniformity of the incident light intensity distribution is low, the number of domain divisions can be increased to mitigate an influence of the incident light intensity distribution on the reproduced image, and in a case where the uniformity of the incident light intensity distribution is high, the number of domain divisions can be decreased to improve the resolution of the reproduced image.

The above-described illumination apparatus according to the present technology may alternatively be configured such that, in a case where the uniformity is evaluated low, the control section provides a larger number of domain divisions than in a case where the uniformity is evaluated high.

This alternative configuration makes it possible to mitigate the influence of the incident light intensity distribution on the reproduced image by increasing the number of domain divisions in a case where the uniformity of the incident light intensity distribution is low, and improve the resolution of the reproduced image by decreasing the number of domain divisions in a case where the uniformity of the incident light intensity distribution is high.

The above-described illumination apparatus according to the present technology may alternatively be configured such that the control section increases the number of domain divisions when a level of evaluation of the uniformity decreases.

This alternative configuration makes it possible to increase effectiveness of mitigating the influence of the incident light intensity distribution on the reproduced image when the uniformity of the incident light intensity distribution becomes lower.

The above-described illumination apparatus according to the present technology may alternatively be configured such that the light source section has a plurality of light emitting elements, and that the control section evaluates the uniformity depending on whether or not non-luminous light emitting elements are detected in the light source section.

This alternative configuration makes it possible to evaluate the uniformity of incident light intensity distribution according to a result of detection of a conduction state of the light emitting elements.

The above-described illumination apparatus according to the present technology may alternatively be configured such that the control section determines, on the basis of a captured image of the projection plane, a difference between the light intensity distribution of a reproduced image on the projection plane and a target light intensity distribution and changes the number of domain divisions according to the determined difference.

This alternative configuration makes it possible to adjust the number of domain divisions in such a manner as to reduce the difference between the light intensity distribution of the reproduced image and the target light intensity distribution.

Meanwhile, an illumination method according to the present technology is the illumination method performed by an illumination apparatus including a light source section and a phase modulation section. The light source section has a light emitting element. The phase modulation section performs spatial light phase modulation on incident light from the light source section. The illumination method controls the phase modulation section in such a manner that a plurality of domains formed by dividing a phase modulation plane of the phase modulation section reproduces a light intensity distribution based on a common phase distribution determined on the basis of the Freeform method in a common region on a projection plane.

The illumination method described above provides operations similar to the operations of the above-described illumination apparatus according to the present technology.

A projector apparatus according to the present technology includes a light source section, a phase modulation section, an intensity modulation section, and a control section. The light source section has a light emitting element. The phase modulation section performs spatial light phase modulation on incident light from the light source section. The intensity modulation section performs spatial light intensity modulation on the light that is subjected to spatial light phase modulation by the phase modulation section. The control section controls the phase modulation section in such a manner that a plurality of domains formed by dividing a phase modulation plane of the phase modulation section reproduces a light intensity distribution based on a common phase distribution determined on the basis of the Freeform method in a common region on an intensity modulation plane of the intensity modulation section.

Accordingly, the projector apparatus, which includes the phase modulation section to improve light utilization efficiency of the incident light from the light source section, ensures that the light intensity distribution of a reproduced image is unlikely to change even if the light intensity distribution of the incident light with respect to the phase modulation section is uneven and non-uniform.

BRIEF DESCRIPTION OF DRAWINGS

FIGS. 4A and B depict explanatory diagrams illustrating current problems with a Freeform method.

FIGS. 6A and B depict explanatory diagrams illustrating operations involved in the image reproduction method according to the first embodiment.

FIG. 7 is an explanatory diagram illustrating a coordinate system for a phase-modulatable region and domains in a phase modulation plane and a coordinate system for a projection region (common region) in a projection plane.

DESCRIPTION OF EMBODIMENTS

Embodiments of the present technology will now be described in the following order with reference to the accompanying drawings.

<1. First Embodiment>
[1-1. Configuration of Illumination Apparatus]
[1-2. Image Reproduction Method According to First Embodiment]
[1-3. Processing Procedure]
<2. Second Embodiment>
[2-1. First Example]
[2-1. Second Example]
<3. Third Embodiment>
[3-1. Configuration of Projector Apparatus]
[3-2. Image Reproduction Method According to Third Embodiment]
<4. Modifications>
<5. Summary of Embodiments>
<6. Present Technology>

1. First Embodiment

1-1. Configuration of Illumination Apparatus

Figure 1:
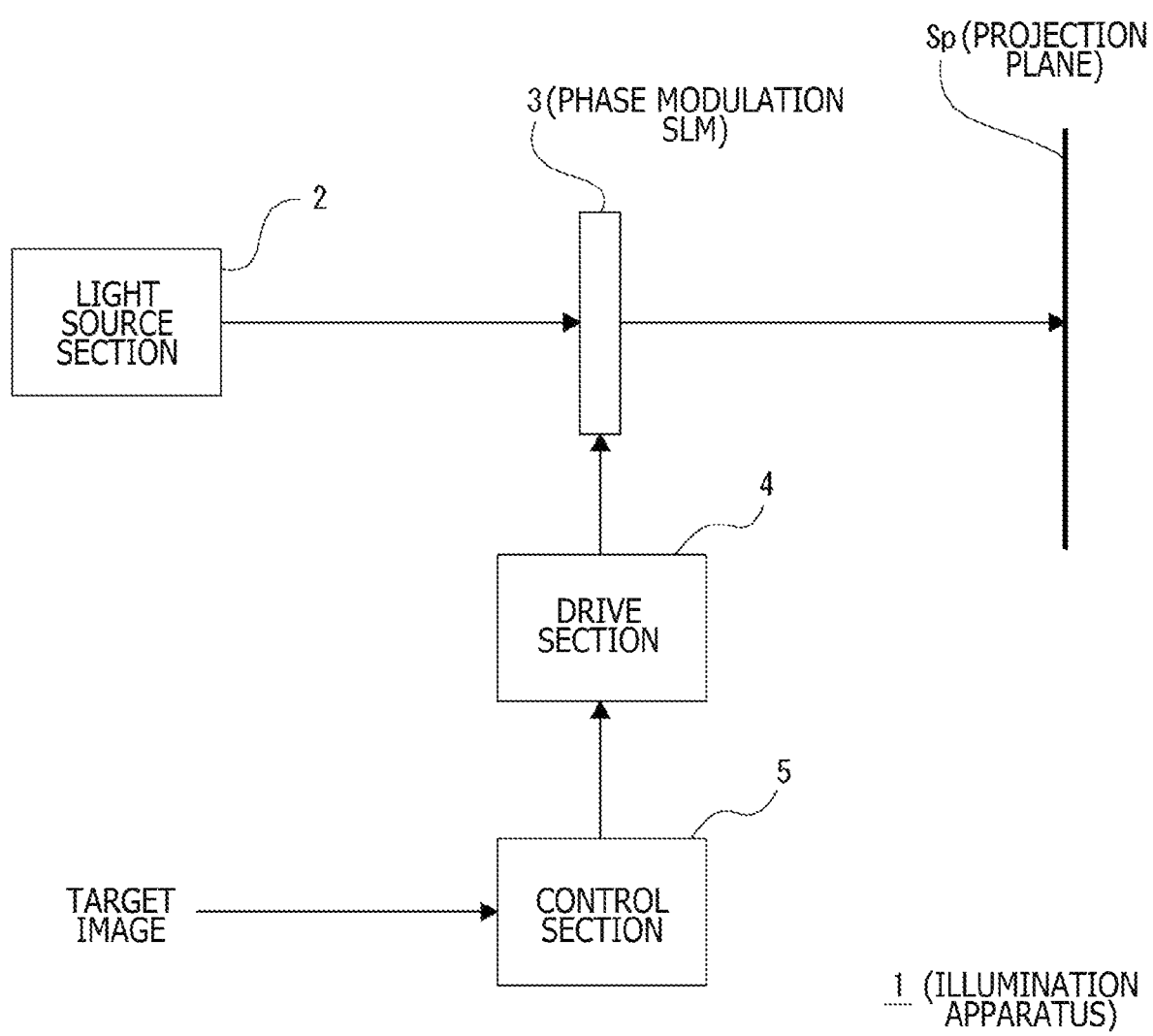
FIG. 1 is a diagram illustrating an example configuration of an illumination apparatus according to a first embodiment of the present technology.

FIG. 1 is a diagram illustrating an example configuration of an illumination apparatus 1 according to a first embodiment of the present technology.

As illustrated in FIG. 1, the illumination apparatus 1 includes a light source section 2, a phase modulation SLM (Spatial Light Modulator) 3, a drive section 4, and a control section 5.

The illumination apparatus 1 is configured to reproduce a desired image (light intensity distribution) on a projection plane Sp by causing the phase modulation SLM 3 to perform spatial light phase modulation on incident light from the light source section 2. The illumination apparatus 1 as described above may be applied, for example, to a headlamp (headlight) of a vehicle. In a case where the illumination apparatus 1 is applied to the headlamp, the illumination apparatus 1 may be configured such that the phase modulation SLM 3 performs spatial light phase modulation to change an irradiation range of a high or low beam.

Figure 2:
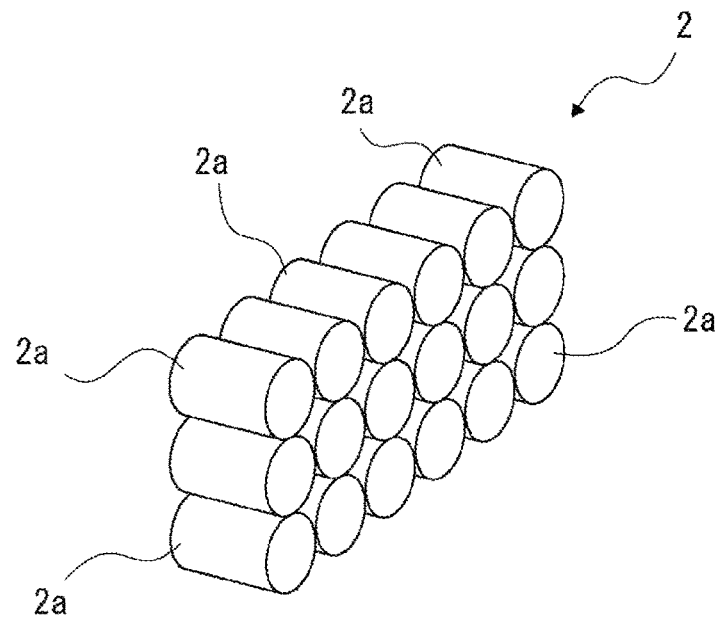
FIG. 2 is an explanatory diagram illustrating an example configuration of a light source section included in the illumination apparatus according to an embodiment.

The light source section 2 functions as a light source for causing light to be incident on the phase modulation SLM 3. In the present example, the light source section 2 includes a plurality of light emitting elements 2a as illustrated, for example, in FIG. 2. More specifically, the light source section 2 includes a light source having a two-dimensional array of the plurality of light emitting elements 2a, and the light emitted from the plurality of light emitting elements 2a is incident on the phase modulation SLM 3.

In the present example, laser light emitting elements are used as the light emitting elements 2a. It should be noted that the light emitting elements 2a are not limited to the laser light emitting elements. For example, LEDs (Light Emitting Diodes), discharge lamps, or other light emitting elements may alternatively be used as the light emitting elements 2a.

The phase modulation SLM 3 includes, for example, a transmissive liquid crystal panel and performs spatial light phase modulation on the incident light.

It should be noted that the phase modulation SLM 3 may alternatively be configured as a reflective spatial light phase modulator instead of a transmissive spatial light phase modulator. For example, a reflective liquid crystal panel or a DMD (Digital Micromirror Device) may be used as the reflective spatial light phase modulator.

The drive section 4 includes a drive circuit for driving the phase modulation SLM 3. The drive section 4 is configured to be able to drive pixels in the phase modulation SLM 3 on an individual basis.

The control section 5 is configured, for instance, as a microcomputer including, for example, a CPU (Central Processing Unit), a ROM (Read Only Memory), and a RAM (Random Access Memory). The control section 5 receives an input of a target image (i.e., information indicating a target light intensity distribution) and calculates the phase distribution of the phase modulation SLM 3 for reproducing the target image on the projection plane Sp. The control section 5 controls the drive section 4 in such a manner as to drive the phase modulation SLM 3 according to the calculated phase distribution.

It should be noted that the phase distribution calculated by the control section 5 in the present embodiment will be described in detail later.

1-2. Image Reproduction Method According to First Embodiment

First, before description of an image reproduction method according to the first embodiment, principles of image reproduction by spatial light phase modulation are described below with reference to FIG. 3.

Figure 3:
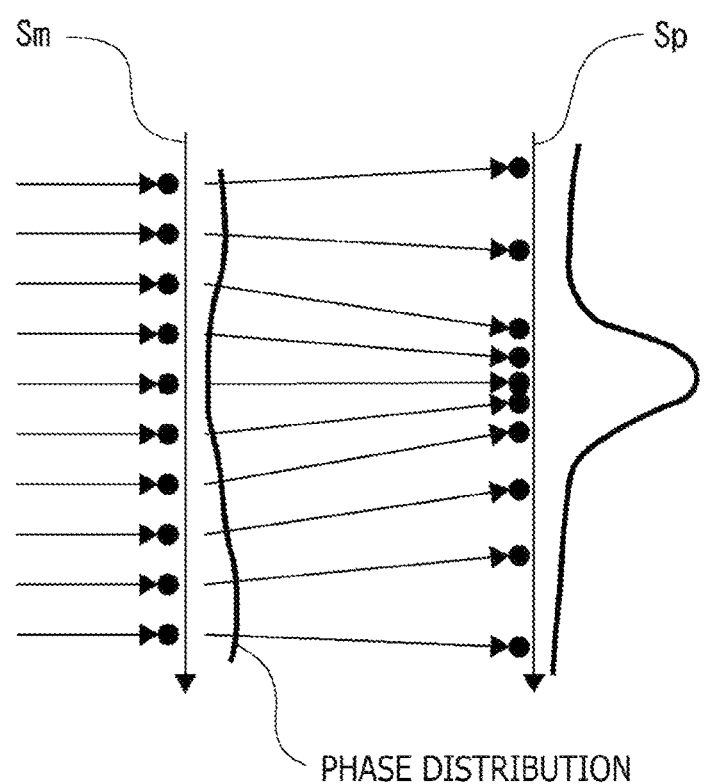
FIG. 3 is an explanatory diagram illustrating principles of image reproduction by spatial light phase modulation.

FIG. 3 schematically illustrates a relation between light rays incident on a phase modulation plane Sm of the phase modulation SLM 3, a wavefront of the phase distribution in the phase modulation SLM 3, phase-modulated light rays, and a light intensity distribution formed on the projection plane Sp by the phase-modulated light rays.

First of all, as a premise, a smooth curve is drawn to indicate the wavefront of the phase distribution in the phase modulation SLM 3 as illustrated in FIG. 3 because a Freeform method is adopted. Since the phase modulation SLM 3 performs spatial light phase modulation, incident light rays are refracted to travel in a normal direction of the wavefront of the phase distribution. Due to this refraction, a portion having a high ray density and a portion having a low ray density are formed on the projection plane Sp. This results in the formation of a light intensity distribution on the projection plane Sp.

Because of the above-described principles, a desired image can be reproduced on the projection plane Sp by a phase distribution pattern set in the phase modulation SLM 3.

Here, as mentioned earlier, the Freeform method is well known as a method of determining the phase distribution for reproducing the target image. The Freeform method is a generic name for a method of determining the phase distribution for reproducing a desired image on the basis of ray optics.

For example, the conventional Freeform method as disclosed in PTL 1, which is mentioned earlier, assumes that the light intensity distribution of light incident on the phase modulation plane Sm is even, as depicted in FIG. 4A, that is, a uniform distribution in which there is no light intensity variation in an in-plane direction. Further, the conventional Freeform method is the method of determining a phase distribution for refracting the incident light rays in such a manner that ray grid points in the whole phase modulation plane and the whole projection plane (points where a virtual light ray penetrates each plane) are connected in an optimal one-to-one relation.

Consequently, in a case where the incident light intensity distribution is uneven because, for instance, the light incident on the phase modulation plane Sm is partially blocked by a shield Oa as depicted in FIG. 4B, the incident light intensity distribution may be superimposed on a reproduced image and cause a failure to achieve proper image reproduction.

Figure 5:
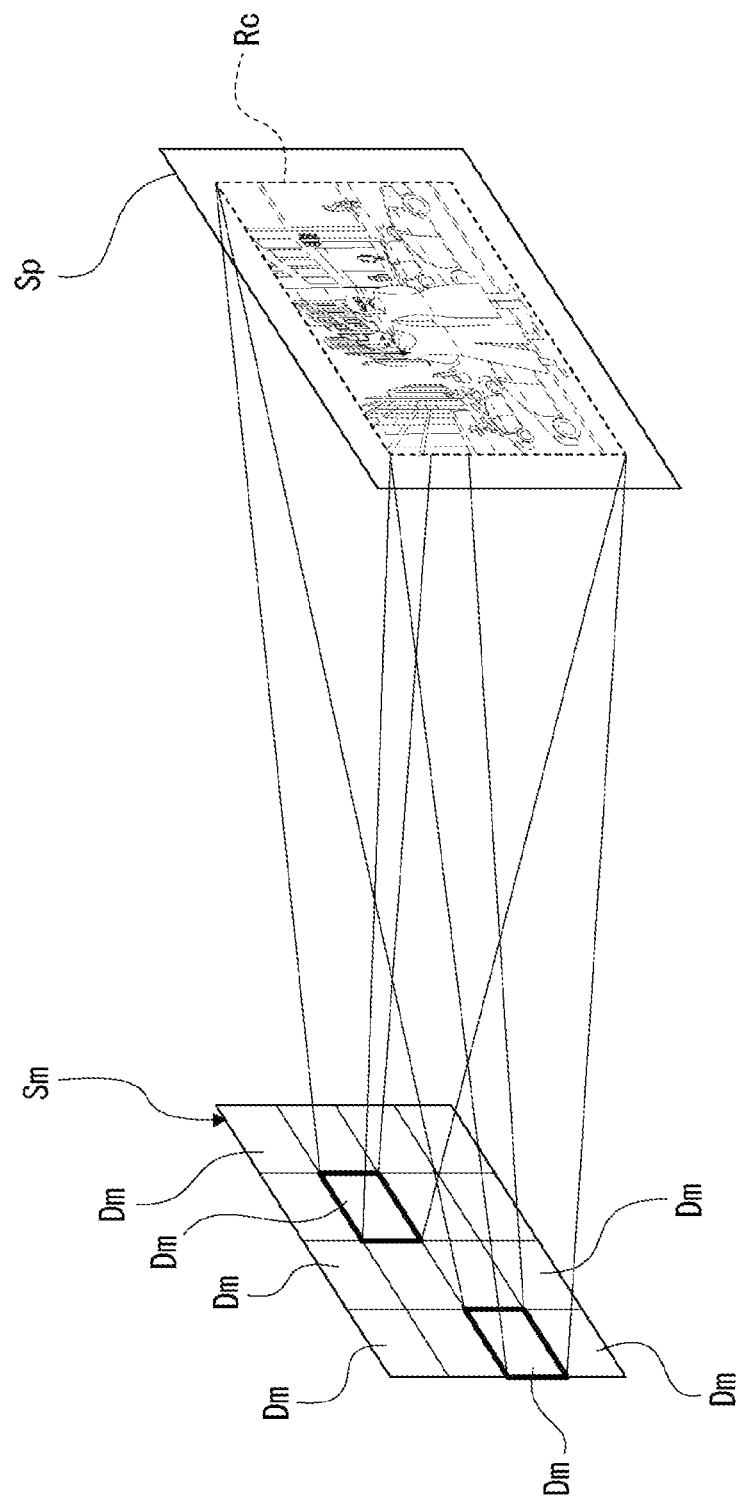
FIG. 5 is an explanatory diagram outlining an image reproduction method according to the first embodiment.

In view of the above circumstances, the present embodiment adopts a method of dividing the phase modulation plane Sm into a plurality of domains Dm as illustrated in FIG. 5 in order to improve robustness against the incident light intensity distribution. More specifically, the present embodiment uses a method of causing the plurality of domains Dm to reproduce a light intensity distribution based on a common phase distribution in a common region Rc on the projection plane Sp. In this instance, the phase distribution common to the plurality of domains Dm is determined by the Freeform method.

Since the plurality of domains Dm reproduces the light intensity distribution based on the common phase distribution in the common region Rc on the projection plane Sp, the light intensity distribution reproduced in the common region Rc represents one obtained by merging light intensity distributions by the individual domains Dm. Therefore, even if the light intensity distribution of the incident light is uneven and non-uniform, contributions from the individual domains Dm are averaged in the projection plane Sp. Consequently, the light intensity distribution of the reproduced image is unlikely to change.

FIG. 6 depicts explanatory diagrams illustrating operations that are performed because the method described with reference to FIG. 5 is adopted.

More specifically, in FIG. 6, FIG. 6A illustrates an image that is reproduced in the common region Rc of the projection plane Sp when the image reproduction method according to the embodiment described with reference to FIG. 5 is adopted in a case where the incident light intensity distribution is non-uniform because the light incident on the phase modulation plane Sm is partially blocked by the shield Oa. Further, FIG. 6B illustrates reproduced images that are provided by the individual domains Dm in a case where the incident light intensity distribution is non-uniform because the light incident on the phase modulation plane Sm is partially blocked by the shield Oa in a manner similar to the above case.

As depicted in FIG. 6B, the domains Dm significantly affected by light shielding, namely, the domains Dm on which a relatively small amount of light is incident due to the influence of light shielding, tend to provide a reproduced image having a relatively small amount of light. Meanwhile, the domains Dm insignificantly affected by light shielding tend to provide a reproduced image having a relatively large amount of light. Therefore, the contributions from the individual domains Dm are averaged in the common region Rc on the projection plane Sp. As a result, even if the light intensity distribution of the incident light is uneven and non-uniform, the light intensity distribution of the reproduced image is unlikely to change.

Consequently, in a case where the light intensity distribution of the incident light is non-uniform, it is possible to make the incident light intensity distribution unlikely to be superimposed on the reproduced image. This improves robustness against the incident light intensity distribution.

Further, since the phase modulation plane Sm is divided into the plurality of domains Dm, the robustness against performance variation from one pixel to another in the phase modulation SLM 3 is also improved. For example, in a case where a certain pixel in the phase modulation SLM 3 becomes defective during the use of the conventional method, which does not divide the phase modulation plane Sm, a desired reproduced image is not normally displayed at a point in the projection plane Sp that corresponds to the defective pixel. In the present embodiment, however, the above-mentioned averaging effect ensures that the desired reproduced image is normally displayed even at the corresponding point in the projection plane Sp.

A specific method of determining the phase distribution of each domain Dm will now be described with reference to FIGS. 7 to 9.

For convenience of explanation, a coordinate system (x,y), a coordinate system (x',y'), and a coordinate system (ux,uy) are hereinafter defined and used as depicted in FIG. 7. The coordinate system (x,y) is defined for a phase-modulatable region in the phase modulation plane. The coordinate system (x',y') is defined for a domain Dm in the phase modulation plane. The coordinate system (ux,uy) is defined for a projection region (the above-mentioned common region Rc) in the projection plane. Further, a shift amount of the location of the domain Dm with respect to the phase-modulatable region is defined as $(\Delta x, \Delta y)$, and an area reduction ratio of the domain Dm with respect to the phase-modulatable region is defined as r (r>2). Moreover, a distance between the phase modulation plane and the projection plane is defined as f.

First of all, the Freeform method is used to determine a phase distribution P for allowing one-to-one correspondence of the light rays from the whole phase-modulatable region to the projection region. As described in PTL 1, a light ray incident on a point $(x,y)=(x_1,y_1)$ in the phase-modulatable region is refracted by the phase distribution P in a manner indicated by a gradient vector of the phase distribution P at the point $(x,y)=(x_1,y_1)$. The gradient vector is expressed in Equation 1 below.

[Math. 1]

$$\left(\frac{\partial P}{\partial x}, \frac{\partial P}{\partial y}\right)\bigg|_{x=x_1, y=y_1} \quad \text{Equation 1}$$

An in-plane displacement between a point $(ux,uy)=(ux_1,uy_1)$ at which the projection plane is penetrated by the light ray and a point $(x,y)=(x_1,y_1)$ in the phase modulation plane is given as the product of the gradient vector and the projection distance f as expressed in Equation 2 below.

[Math. 2]

$$\begin{pmatrix} ux_1 \\ uy_1 \end{pmatrix} - \begin{pmatrix} x_1 \\ y_1 \end{pmatrix} = f \cdot \begin{pmatrix} \frac{\partial P}{\partial x} \\ \frac{\partial P}{\partial y} \end{pmatrix}\bigg|_{x=x_1, y=y_1} \quad \text{Equation 2}$$

Therefore, a correspondence relation between the point at which the phase modulation plane is penetrated by a light ray refracted by the phase distribution P and the point at which the projection plane is penetrated by the same light ray is given by Equation 3 below.

[Math. 3]

$$\begin{pmatrix} ux(x,y) \\ uy(x,y) \end{pmatrix} = \begin{pmatrix} x \\ y \end{pmatrix} + f \cdot \begin{pmatrix} \frac{\partial P}{\partial x} \\ \frac{\partial P}{\partial y} \end{pmatrix}\bigg|_{x,y} \quad \text{Equation 3}$$

The phase distribution to be given to the domain Dm is now referred to as "P'."

Figure 8:
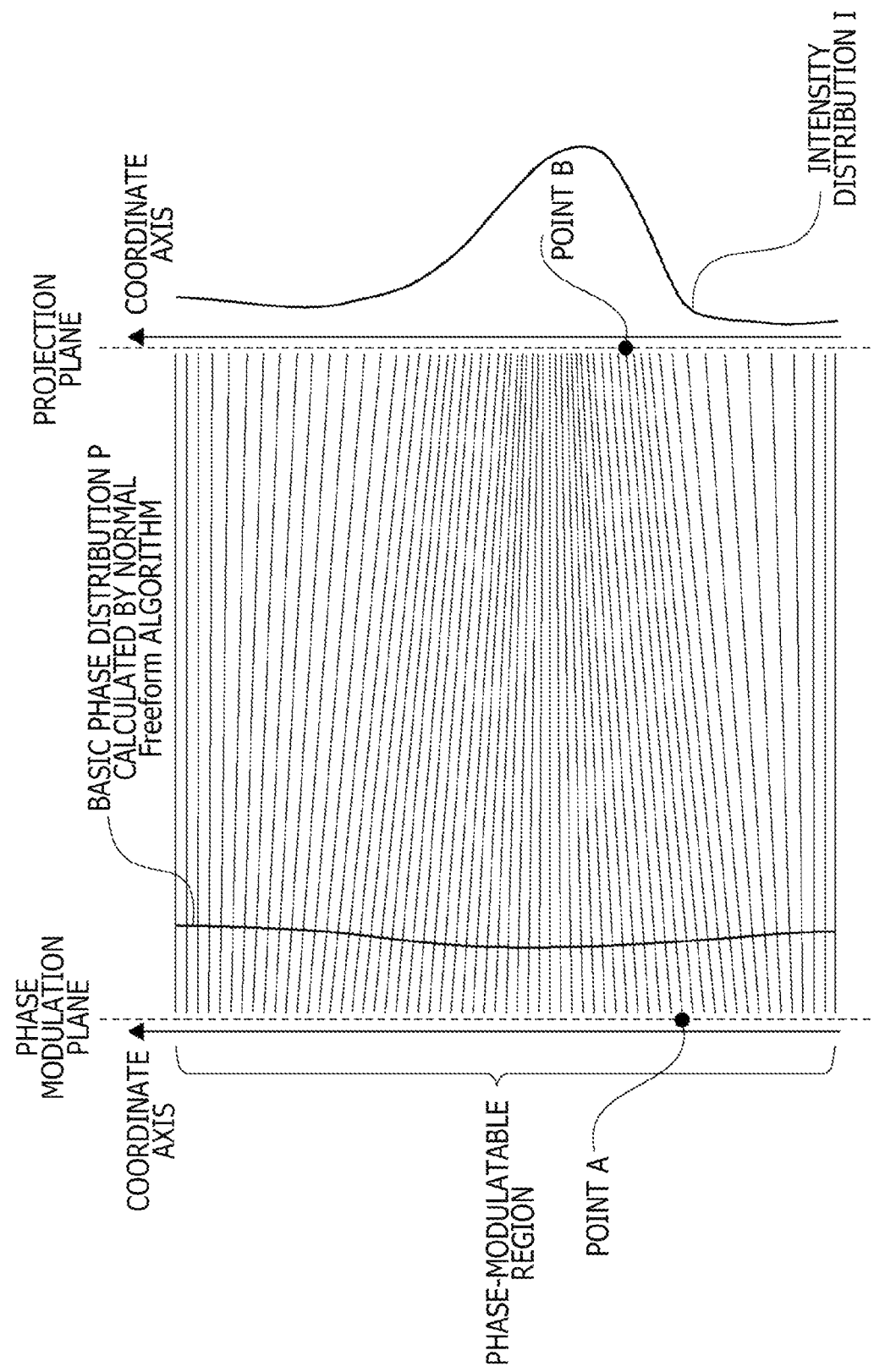
FIG. 8 is a schematic diagram illustrating a relation between a phase distribution of the whole phase-modulatable region and an intensity distribution implemented in the projection region by the phase distribution.
Figure 9:
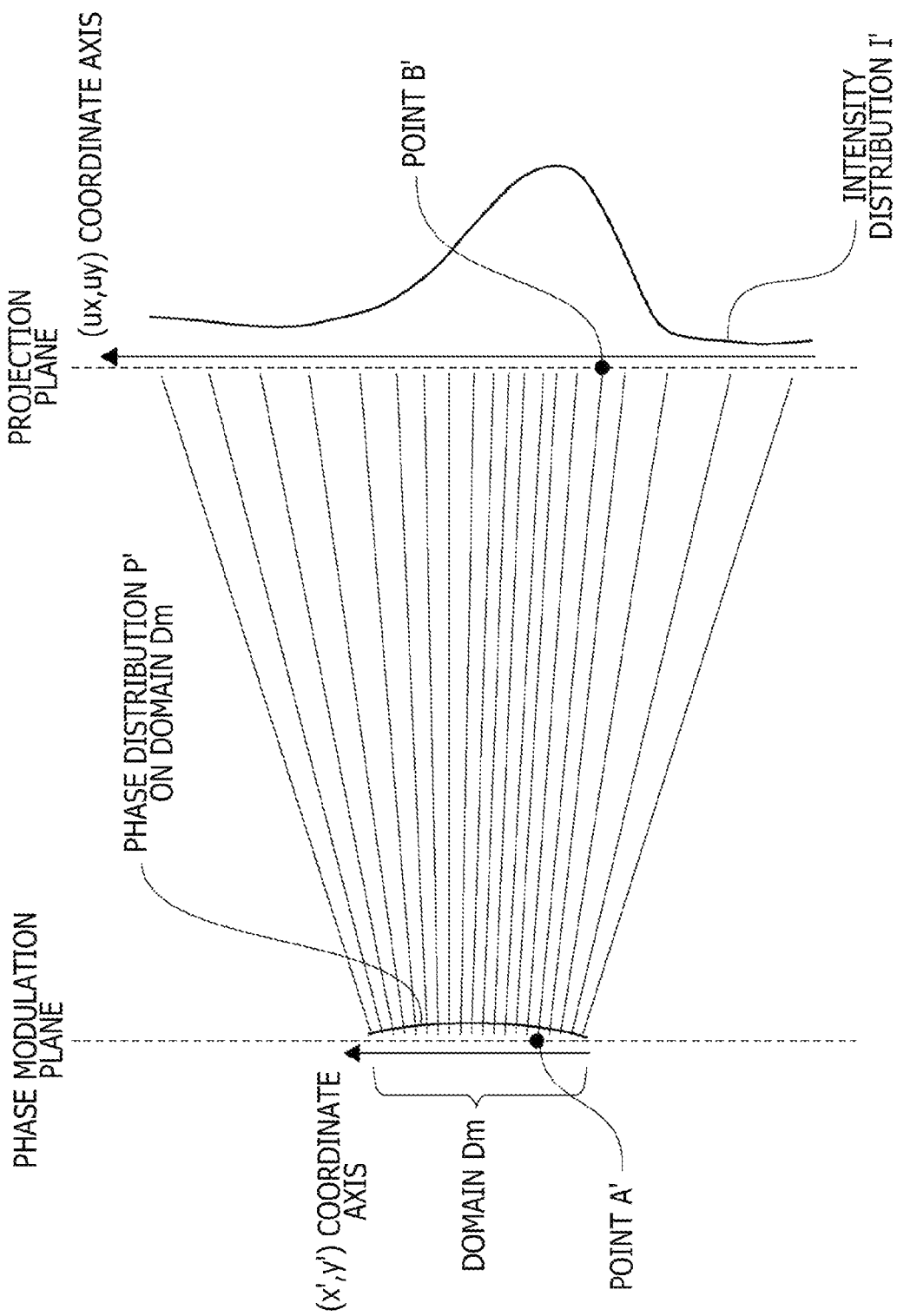
FIG. 9 is a schematic diagram illustrating a relation between the phase distribution of the domains and the intensity distribution implemented in the projection region by the phase distribution.

As depicted in FIGS. 8 and 9, an intensity distribution achieved in the projection region when the light ray incident on the whole phase-modulatable region is refracted by the phase distribution P is now referred to as "I," and an intensity distribution achieved in the projection region when the light ray incident on the domain Dm is refracted by a phase distribution P' is now referred to as "I'." A condition to be satisfied by the phase distribution P' is that the intensity distribution I and the intensity distribution I' agree with each other.

Now it is assumed here that a certain point on the domain Dm is a point A' as depicted in FIG. 9 while its coordinates are $(x',y')=(s_x,s_y)$. Further, it is assumed that a point at which the projection plane is penetrated by a light ray refracted by the phase distribution P' at the point A' is a point B'.

Further, it is assumed, as depicted in FIG. 8, that a point on the phase-modulatable region having a correspondence relation of coordinates $(x,y)=(r \cdot S_x, r \cdot S_y)$ with respect to the point A' is a point A while a point at which the projection plane is penetrated by a light ray refracted by the phase distribution P at the point A is a point B.

In order to make the intensity distribution I agree with the intensity distribution I', it is sufficient to determine the phase distribution P' in such a manner that the point B agrees with the point B'. If it is supposed that the phase distribution P' satisfying the above-mentioned condition exists, the product of the gradient vector of the phase distribution P' at the point A' and the projection distance f agrees with an in-plane displacement between the point B and the point A', as described in conjunction with Equation 2. However, coordinates of the point B are as expressed in Equation 4 below, which uses the left-side expression in Equation 3.

[Math. 4]

$$\begin{pmatrix} ux \\ uy \end{pmatrix} = \begin{pmatrix} ux(x,y) \\ uy(x,y) \end{pmatrix}\bigg|_{x=r \cdot s_x, y=r \cdot s_y} \quad \text{Equation 4}$$

When attention is paid to the fact that the coordinates of the point A' in the (x,y) coordinate system are $(x,y)=(s_x+\Delta x, s_y+\Delta y)$, Equation 5 below is obtained as a conditional expression to be satisfied by the phase distribution P'.

[Math. 5]

$$f \cdot \begin{pmatrix} \frac{\partial P'}{\partial x'} \\ \frac{\partial P'}{\partial y'} \end{pmatrix}\bigg|_{x'=s_x, y'=s_y} = \begin{pmatrix} ux(x,y) \\ uy(x,y) \end{pmatrix}\bigg|_{x=r \cdot s_x, y=r \cdot s_y} - \begin{pmatrix} s_x + \Delta x \\ s_y + \Delta y \end{pmatrix} \quad \text{Equation 5}$$

By using Equation 3, Equation 5 can be rewritten as Equation 6 below.

[Math. 6]

$$\begin{pmatrix} \frac{\partial P'}{\partial x'} \\ \frac{\partial P'}{\partial y'} \end{pmatrix}\bigg|_{x'=s_x, y'=s_y} = \begin{pmatrix} \frac{\partial P}{\partial x} \\ \frac{\partial P}{\partial y} \end{pmatrix}\bigg|_{x=r \cdot s_x, y=r \cdot s_y} + \frac{1}{f} \cdot \begin{pmatrix} (r-1) \cdot s_x - \Delta x \\ (r-1) \cdot s_y - \Delta y \end{pmatrix} \quad \text{Equation 6}$$

Here, since the point A' is a point on the domain Dm, a conditional expression such as Equation 7 below is obtained. Equation 7 is obtained when $(s_x, s_y)$ in Equation 6 are newly rewritten as $(x', y')$.

[Math. 7]

$$\begin{pmatrix} \frac{\partial P'}{\partial x'} \\ \frac{\partial P'}{\partial y'} \end{pmatrix}\bigg|_{x',y'} = \begin{pmatrix} \frac{\partial P}{\partial x} \\ \frac{\partial P}{\partial y} \end{pmatrix}\bigg|_{x=r \cdot x', y=r \cdot y'} + \frac{1}{f} \cdot \begin{pmatrix} (r-1) \cdot x' - \Delta x \\ (r-1) \cdot y' - \Delta y \end{pmatrix} \quad \text{Equation 7}$$

When a rotation field regarding $(x',y')$ on the right side of Equation 7 is calculated, Equation 8 below is obtained.

[Math. 8]

$$\begin{pmatrix} \frac{\partial}{\partial x'} \\ \frac{\partial}{\partial y'} \end{pmatrix} \times \left\{ \begin{pmatrix} \frac{\partial P}{\partial x} \\ \frac{\partial P}{\partial y} \end{pmatrix}\bigg|_{x=r \cdot x', y=r \cdot y'} + \frac{1}{f} \cdot \begin{pmatrix} (r-1) \cdot x' - \Delta x \\ (r-1) \cdot y' - \Delta y \end{pmatrix} \right\} = r \cdot \begin{pmatrix} \frac{\partial}{\partial x} \\ \frac{\partial}{\partial y} \end{pmatrix} \times \begin{pmatrix} \frac{\partial P}{\partial x} \\ \frac{\partial P}{\partial y} \end{pmatrix}\bigg|_{x=r \cdot x', y=r \cdot y'} \quad \text{Equation 8}$$

Here, the phase distribution P is a known scalar field on (x,y), and the rotation field of its gradient field is zero with respect to any (x,y). Therefore, Equation 8 is eventually zero. In general, a necessary and sufficient condition under which a scalar field giving a certain vector field as the gradient field exists is that the rotation field of such a vector field be zero at any point. Therefore, when the rotation field of the right side of the conditional expression indicated in Equation 7 is zero, it signifies that the phase distribution P' satisfying Equation 7, namely, the phase distribution P' giving the right side of Equation 7 as the gradient field, really exists. Consequently, the value of the phase distribution P' at a certain point $(x',y')=(s_x, s_y)$ on the domain Dm can be configured as indicated below by line-integrating the right side of Equation 7.

[Math. 9]

$$P'|_{x'=s_x, y'=s_y} = \int_{t=0}^{t=s_x} \frac{\partial P'}{\partial x'}\bigg|_{x'=t, y'=0} dt + \int_{t=0}^{t=y_x} \frac{\partial P'}{\partial y'}\bigg|_{x'=s_x, y'=t} dt \qquad \text{Equation 9}$$

$$= \frac{1}{r} \cdot P|_{x=r \cdot s_x, y=r \cdot s_y} + \frac{1}{2} \cdot \frac{r-1}{f} \cdot (s_x^2 + s_y^2) - \frac{\Delta x \cdot s_x + \Delta y \cdot s_y}{f} \qquad \text{Equation 10}$$

The first term of Equation 10 above indicates a component that is obtained by scaling the phase distribution P in both a spatial direction and a phase direction by a reduction ratio r. Meanwhile, the second and third terms of Equation 10 indicate lens components determined by the location of the domain Dm. Therefore, in order to calculate the phase distribution P' of each domain division, it is sufficient to first perform spatial-direction scaling and phase-direction scaling on the phase distribution P determined by the Freeform method, add the lens components corresponding to the location of each domain Dm to the scaled phase distribution, and assign the result of the addition as the phase distribution P' of each domain Dm.

Performing the above steps makes it possible to reproduce a common light intensity distribution in a common projection region on the projection plane without shifting the location of the reproduced image derived from each domain Dm.

Now, the phase distribution P determined for the whole phase-modulatable region is hereinafter referred to as a "basic phase distribution Dpr." Further, the phase distribution obtained by performing the spatial-direction scaling and the phase-direction scaling on the basic phase distribution Dpr according to the sizes of the domains Dm is hereinafter referred to as a "common phase distribution Dpc."

It should be noted that the basic phase distribution Dpr is determined as the phase distribution of the whole phase-modulatable region on the phase modulation plane Sm. However, the basic phase distribution Dpr is the phase distribution corresponding to the size of a basic region Ar that is set on the phase modulation plane Sm. The size of the basic region Ar is only required to be at least larger than the sizes of the domains Dm and not larger than the size of the phase-modulatable region on the phase modulation plane Sm.

In the above instance, the basic phase distribution Dpr is scaled by a ratio of "ard/arr" when the area of the basic region Ar is "arr" and the areas of the domains Dm are "ard."

Figure 10:
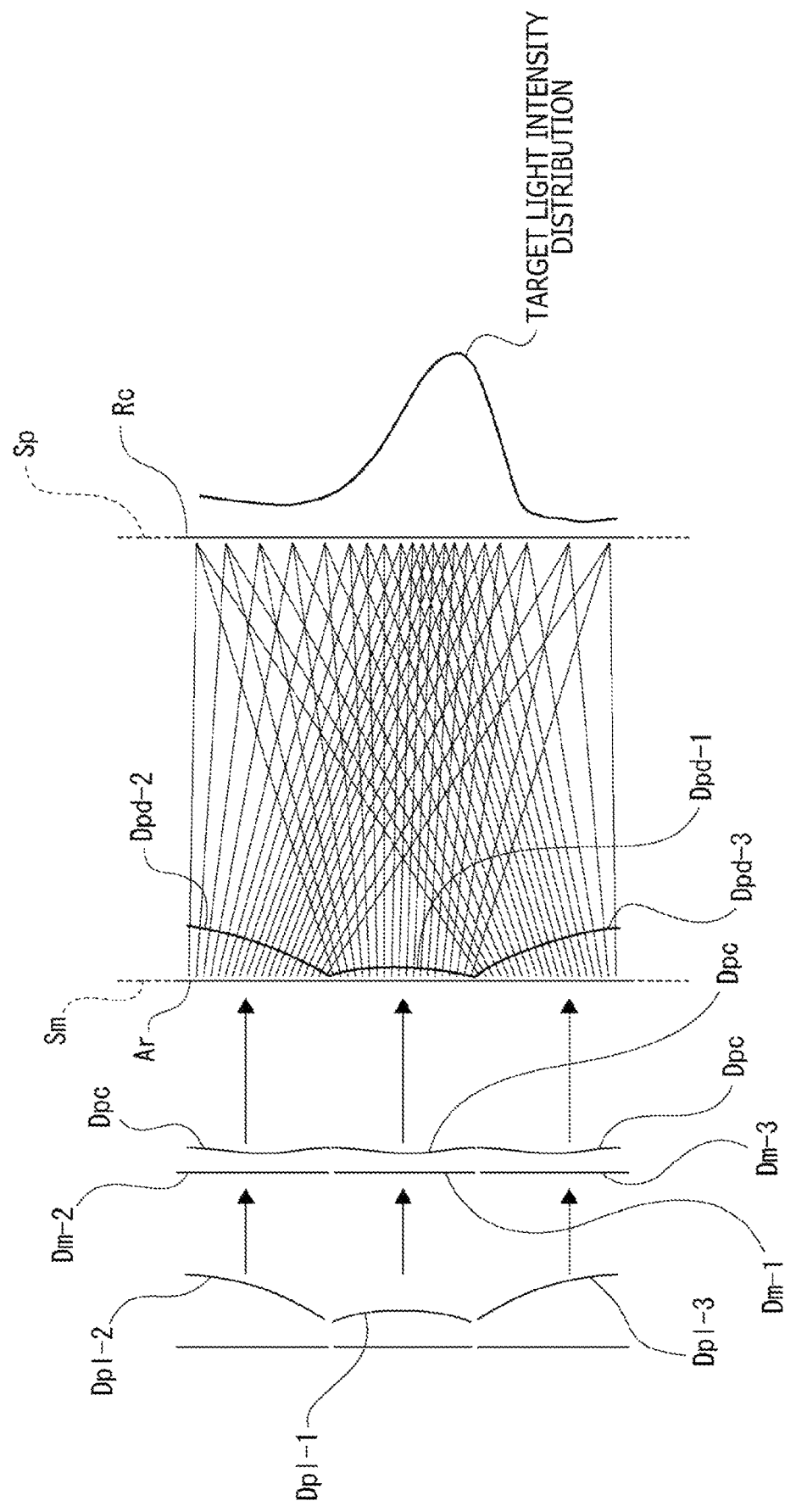
FIG. 10 is an explanatory diagram illustrating addition of lens components to a scaled phase distribution.

FIG. 10 is an explanatory diagram illustrating the addition of the lens components.

The domains illustrated in FIG. 10 are a domain Dm-1, a domain Dm-2, and a domain Dm-3. The domain Dm-1 is located at the center. The domain Dm-2 is located above the domain Dm-1. The domain Dm-3 is located below the domain Dm-1. The phase distribution depicted as a lens component Dpl-1 is the phase distribution of the lens component corresponding to the location of the domain Dm-1. The phase distribution depicted as a lens component Dpl-2 is the phase distribution of the lens component corresponding to the location of the domain Dm-2. The phase distribution depicted as a lens component Dpl-3 is the phase distribution of the lens component corresponding to the location of the domain Dm-3.

As depicted in FIG. 10, a phase distribution Dpd-1 to be set for the domain Dm-1 is determined as a phase distribution that is obtained by adding the lens component Dpl-1 to the common phase distribution Dpc. Similarly, a phase distribution Dpd-2 to be set for the domain Dm-2 is determined as a phase distribution that is obtained by adding the lens component Dpl-2 to the common phase distribution Dpc. Likewise, a phase distribution Dpd-3 to be set for the domain Dm-3 is determined as a phase distribution that is obtained by adding the lens component Dpl-3 to the common phase distribution Dpc.

Consequently, the domains Dm-1, Dm-2, and Dm-3 are each able to reproduce a common light intensity distribution in the common region Rc on the projection plane Sp.

The phase distributions obtained by adding the lens components Dpl corresponding to the respective domains Dm to the common phase distribution Dpc as described above are hereinafter generically referred to as "domain phase distributions Dpd."

1-3. Processing Procedure

A specific example of a processing procedure for determining the domain phase distributions Dpd will now be described with reference to the flowchart of FIG. 11.

Figure 11:
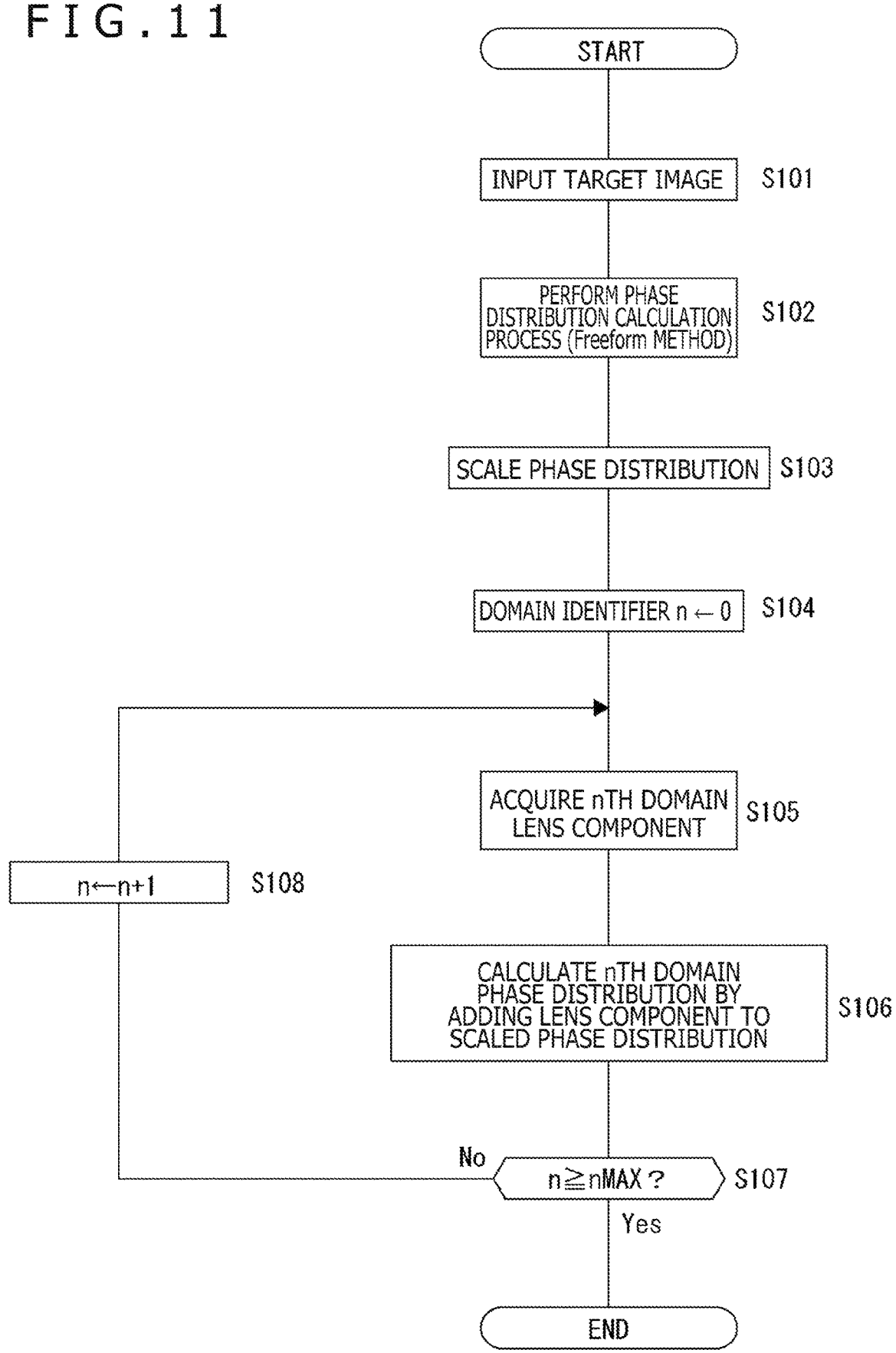
FIG. 11 is a flowchart illustrating a specific example of processing for determining the phase distribution of each domain.

It should be noted that the processing depicted in FIG. 11 is executed by the control section 5 depicted in FIG. 1.

First of all, in step S101, the control section 5 inputs a target image.

Here, in a case where a video image is to be reproduced, the target image to be inputted is a frame image included in the video image. In the case of video image reproduction, the processing depicted in FIG. 11 is repeatedly executed at frame intervals of the video image. In a case where a still image is to be reproduced, the still image is inputted as the target image. In this case, the processing depicted in FIG. 11 is only required to be executed at least once for a still image to be reproduced.

In step S102, which succeeds step S101, the control section 5 executes a phase distribution calculation process. The phase distribution calculation process is a process of calculating the above-described basic phase distribution Dpr by the Freeform method. More specifically, the basic phase distribution Dpr for reproducing the target image inputted in step S101 on the projection plane Sp is calculated by the Freeform method.

In step S103, which succeeds step S102, the control section 5 scales the phase distribution. More specifically, the common phase distribution Dpc is obtained by performing the above-mentioned spatial-direction scaling and phase-direction scaling on the basic phase distribution Dpr calculated in step S102.

In step S104, which succeeds step S103, the control section 5 resets a domain identifier n to an initial value of 0. The domain identifier n is an identifier that is managed by the control section 5 in order to identify the domain Dm to be processed.

In step S105, which succeeds step S104, the control section 5 acquires a lens component Dpl of the nth domain. Here, in the present example, the lens component Dpl of each domain Dm is pre-stored in the control section 5. Therefore, in step S105, the control section 5 performs a process of acquiring the lens component Dpl of the nth domain Dm, which is among the stored lens components Dpl.

In step S106, which succeeds step S105, the control section 5 calculates the phase distribution of the nth domain by adding the lens component Dpl to the scaled phase distribution. More specifically, the domain phase distribution Dpd of the nth domain Dm is calculated by adding the lens component Dpl acquired in step S105 to the common phase distribution Dpc obtained in the scaling process performed in step S103.

In step S107, which succeeds step S106, the control section 5 determines whether or not the domain identifier n is equal to or greater than the maximum value nMAX. Here, the maximum value nMAX is a value corresponding to the number of domain Dm divisions. If, for example, the number of domain Dm divisions is equal to 16, the value "15" is set as the maximum value nMAX.

In a case where the domain identifier n is smaller than the maximum value nMAX in step S107, the control section 5 proceeds to step S108, increments the domain identifier n by one, and returns to step S105. Consequently, in a case where the domain phase distribution Dpd has not been calculated for any domain Dm, step S105 and the subsequent steps are performed for the next domain Dm.

Meanwhile, if, in step S107, the domain identifier n is equal to or greater than the maximum value nMAX, the control section 5 terminates the series of processing depicted in FIG. 11.

Further, the above description is given on the assumption that all the domains Dm reproduce a common light intensity distribution in the common region Rc on the projection plane Sp.

Figure 12:
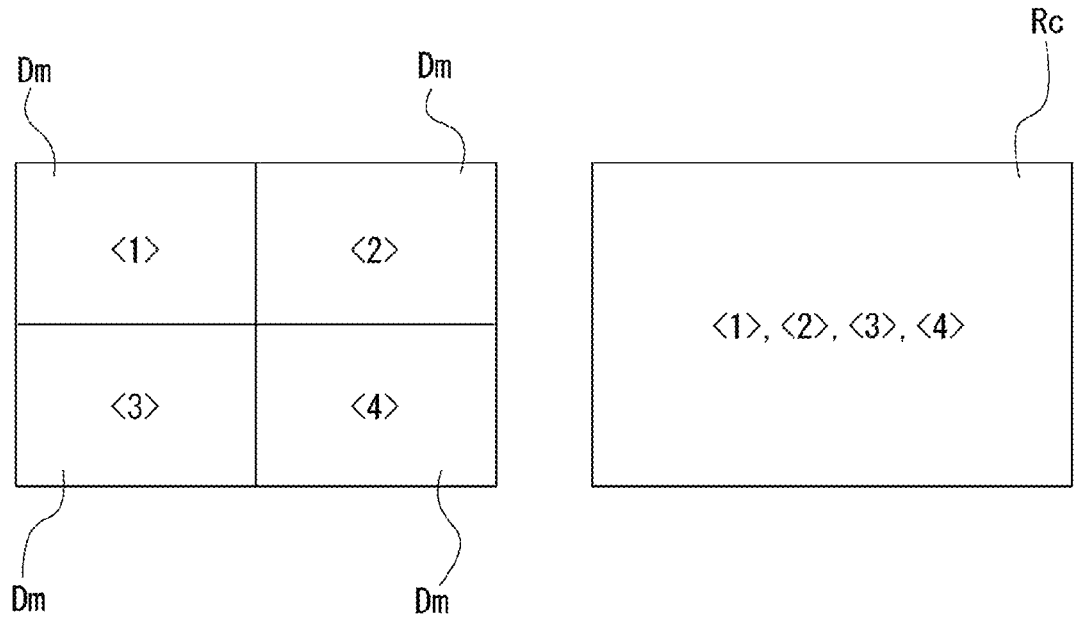
FIG. 12 is a schematic diagram illustrating that all the domains reproduce a common light intensity distribution in a common region.

FIG. 12 schematically indicates that all the domains Dm reproduce a common light intensity distribution in the common region Rc in this manner.

Figure 13:
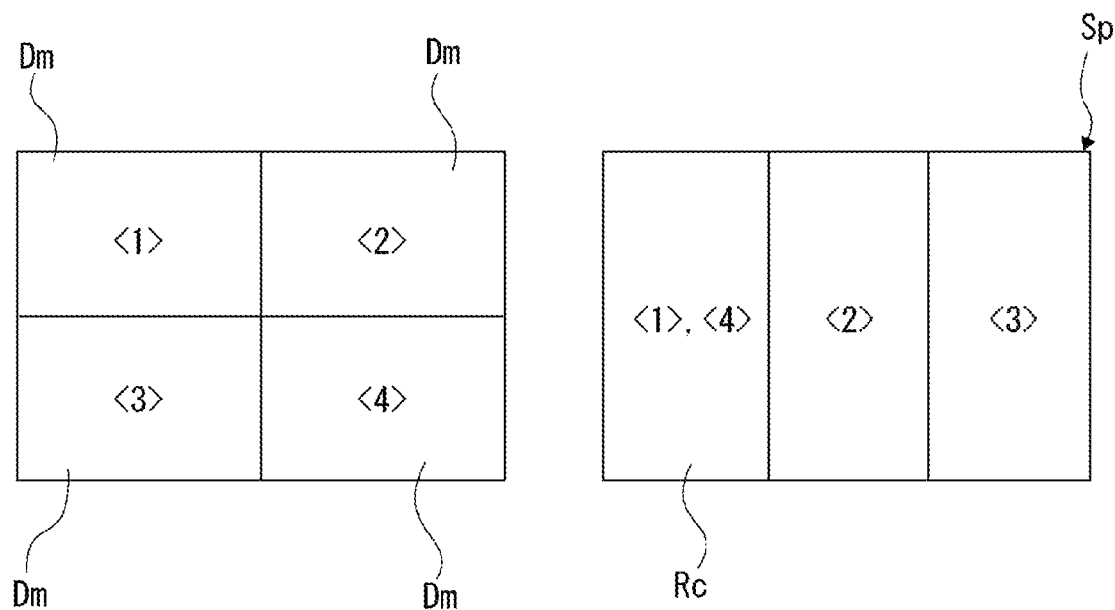
FIG. 13 is an explanatory diagram illustrating an example in which the common light intensity distribution is reproduced in the common region by only some of the domains.

However, it is not essential that all the domains Dm reproduce a common light intensity distribution in the common region Rc. As illustrated in FIG. 13, an alternative configuration can be adopted to cause only some domains Dm to reproduce a common light intensity distribution in the common region Rc.

2. Second Embodiment

2-1. First Example

A second embodiment will now be described.

The second embodiment is configured to dynamically change the number of domain Dm divisions.

As a first example of the second embodiment, the following describes an example in which the number of domain Dm divisions is changed according to the result of evaluation of uniformity of the light intensity distribution of the incident light.

The light intensity distribution of the incident light can change over time. Particularly, in a case where a light source having an array of the plurality of light emitting elements 2a is used as the light source section 2 as described in conjunction with the present example, some light emitting elements 2a may become non-luminous due, for instance, to a failure. Accordingly, the incident light intensity distribution with respect to the phase modulation SLM 3 can change over time.

As is understandable from the principles described with reference to FIG. 6, the effect of averaging the incident light intensity distribution by the individual domains Dm tends to decrease with a decrease in the number of domain Dm divisions, and tends to increase with an increase in the number of domain Dm divisions. Meanwhile, in a case where the number of domain Dm divisions is decreased, an increased number of pixels are assigned to each domain Dm. This can improve the resolution of the reproduced image.

Consequently, the present example adopts a method of evaluating uniformity of the light intensity distribution of the incident light and ensuring that the number of domain Dm divisions is larger in a case where the uniformity is evaluated low than in a case where the uniformity is evaluated high.

This makes it possible to mitigate the influence of the incident light intensity distribution on the reproduced image by increasing the number of domain Dm divisions in a case where the uniformity of the incident light intensity distribution is low, and improve the resolution of the reproduced image by decreasing the number of domain Dm divisions in a case where the uniformity of the incident light intensity distribution is high.

As a result, the balance between the robustness against the incident light intensity distribution and the resolution of the reproduced image can be properly adjusted according to the incident light intensity distribution.

Figure 14:
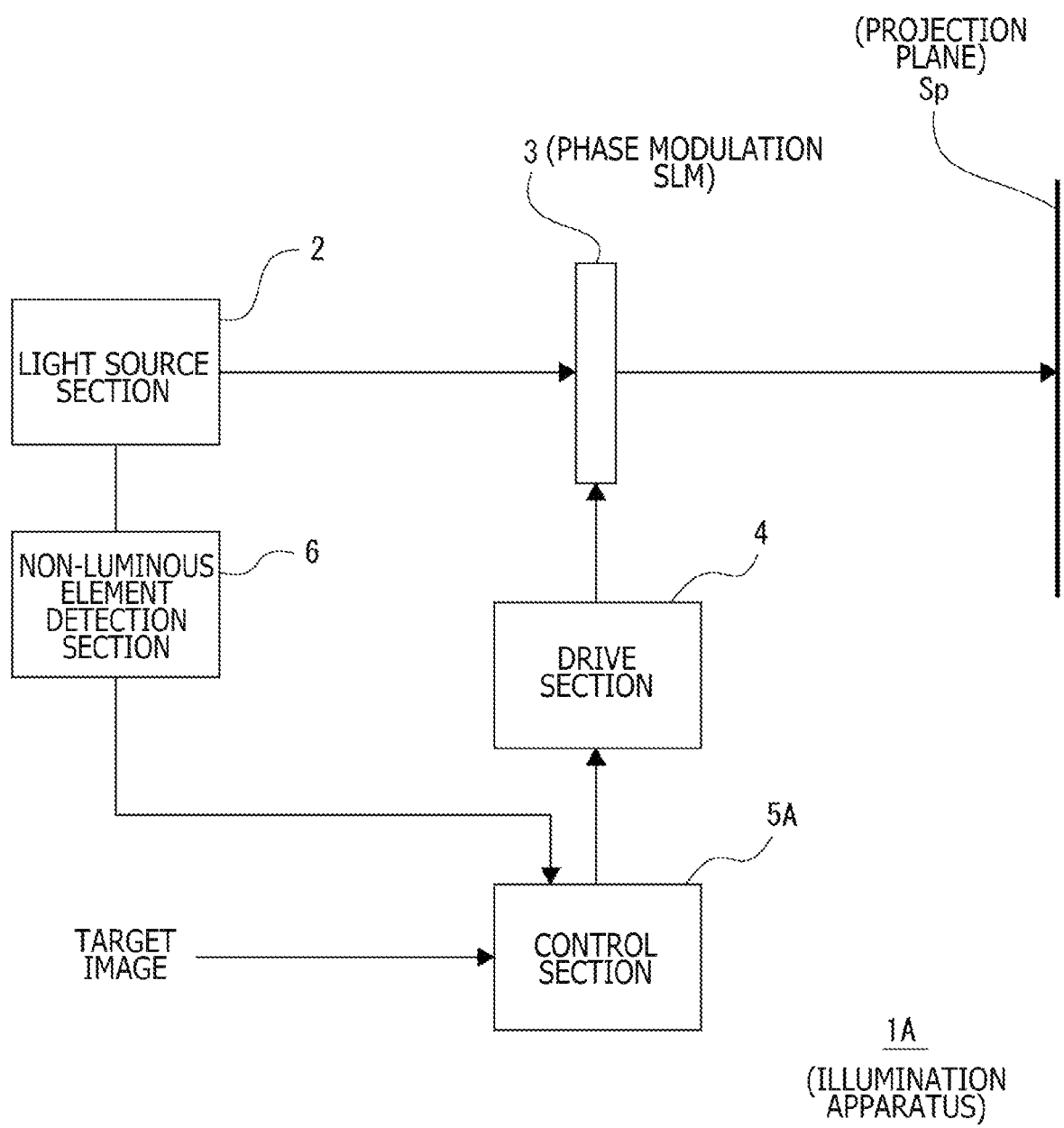
FIG. 14 is a diagram illustrating an example configuration of an illumination apparatus according to a first example of a second embodiment.

FIG. 14 is a diagram illustrating an example configuration of an illumination apparatus 1A according to the first example of the second embodiment.

It should be noted that, in the following description, parts similar to the parts already described are designated by the same reference signs as the corresponding parts and will not be redundantly described.

The illumination apparatus 1A differs from the illumination apparatus 1 depicted in FIG. 1 in that a non-luminous element detection section 6 is included, and that a control section 5A is included instead of the control section 5.

The non-luminous element detection section 6 detects non-luminous light emitting elements 2a in the light source section 2. For example, the non-luminous element detection section 6 detects non-luminous light emitting elements 2a according to a conduction state of each light emitting element 2a. More specifically, the non-luminous element detection section 6 in the present example monitors a drive current value of each light emitting element 2a and detects, as the non-luminous light emitting elements 2a, light emitting elements 2a having a drive current value equal to or smaller than a predetermined value.

The control section 5A performs a process of dynamically changing the number of domain Dm divisions according to the result of detection by the non-luminous element detection section 6. More specifically, the control section 5A performs a process depicted in FIG. 15.

Figure 15:
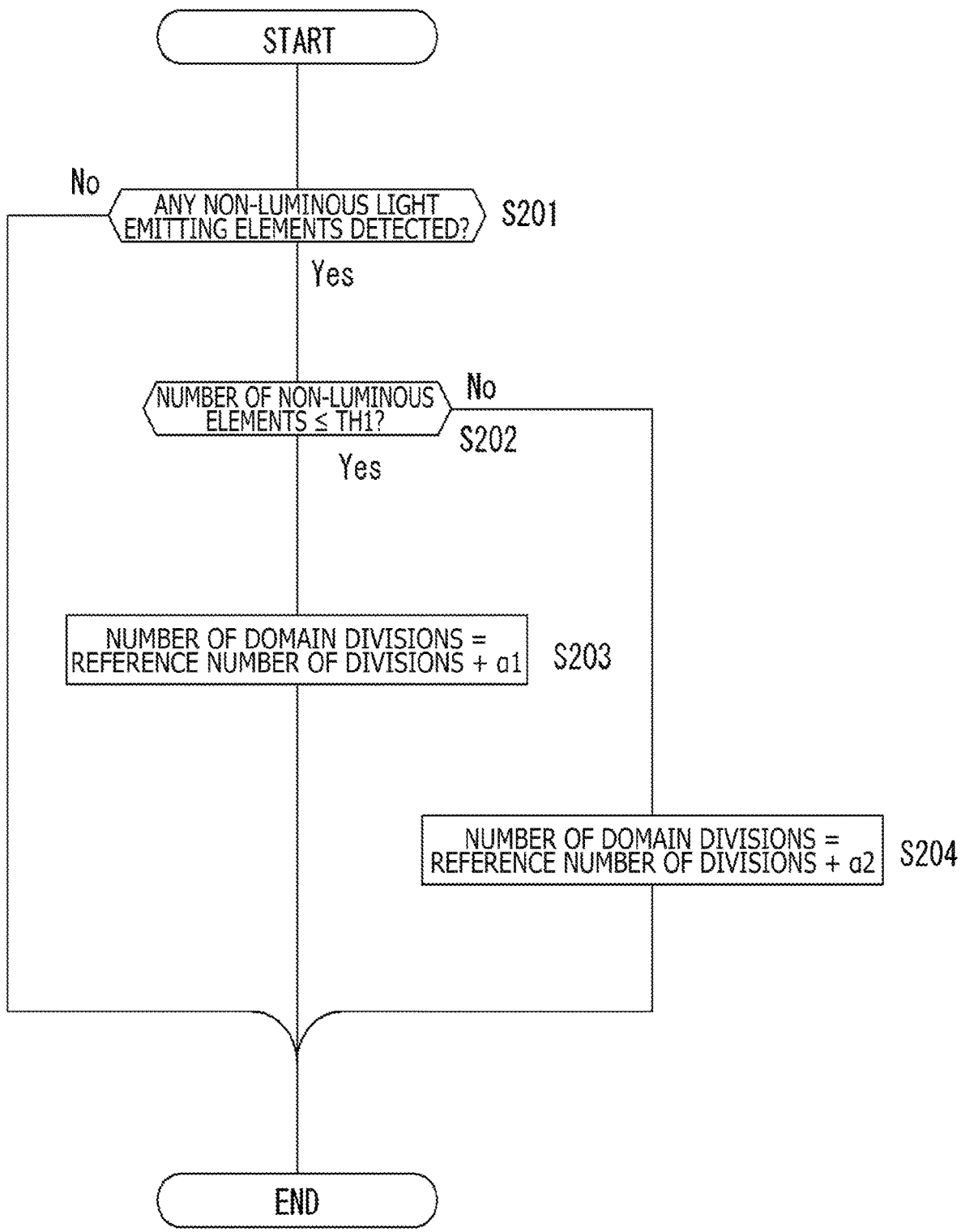
FIG. 15 is a flowchart illustrating an example of domain division processing according to the first example of the second embodiment.

FIG. 15 is a flowchart illustrating an example of domain division processing according to the first example of the second embodiment.

First of all, in step S201, the control section 5A determines whether or not non-luminous light emitting elements 2a exist. This determination is made according to the result of detection by the non-luminous element detection section 6.

In a case where it is determined that no non-luminous light emitting elements 2a exist, the control section 5A terminates the series of processing depicted in FIG. 15. That is, in this case, the number of domain Dm divisions remains unchanged. More specifically, a later-described reference number of divisions is maintained.

Meanwhile, in a case where it is determined that non-luminous light emitting elements 2a exist, the control section 5A proceeds to step S202 and determines whether or not the number of non-luminous elements (the number of non-luminous light emitting elements 2a) is equal to or smaller than a threshold TH1. Here, the threshold TH1 is set to a natural number of 2 or greater. It should be noted that the number of non-luminous elements can be determined on the basis of the result of detection by the non-luminous element detection section 6.

If the number of non-luminous elements is equal to or smaller than the threshold TH1, the control section 5A proceeds to step S203 and sets the number of domain divisions to a "reference number of divisions+$\alpha$1." Here, the reference number of divisions is predetermined as the reference number of domain Dm divisions. In the present example, the reference number of divisions is determined on the basis of a state where no non-luminous light emitting elements 2a exist in the light source section 2. For example, the reference number of divisions may be set to 4×4=16 or 6×6=36 although it may vary, for instance, with the number of pixels in the phase modulation SLM 3.

Meanwhile, if the number of non-luminous elements is greater than the threshold TH1, the control section 5A proceeds to step S204 and sets the number of domain divisions to a "reference number of divisions+$\alpha$2." In this instance, $\alpha 2 > \alpha 1$.

Consequently, if the number of non-luminous elements is 1 or greater and not greater than the threshold TH1, the "reference number of divisions+$\alpha$1" is set as the number of domain Dm divisions, and in a case where the number of non-luminous elements is greater than the threshold TH1, the "reference number of divisions+$\alpha$2," which is greater than the "reference number of divisions+$\alpha$1," is set as the number of domain Dm divisions. Stated differently, the number of domain Dm divisions increases with a decrease in the level of evaluation of uniformity of the incident light intensity distribution.

Upon completion of step S203 or S204, the control section 5A terminates the series of processing depicted in FIG. 15.

Here, in a case where the number of domain Dm divisions is to be dynamically changed, a domain Dm-specific lens component Dpl is prepared for each of a possible number of domain Dm divisions. For example, relevant data is stored in a memory readable by the control section 5A. In a case where the number of domain Dm divisions is changed, the control section 5A checks a domain Dm-specific lens component Dpl for each domain Dm division thus stored in the memory, acquires domain Dm-specific lens components Dpl for the changed number of domain divisions, and uses the acquired domain Dm-specific lens components Dpl to calculate the domain phase distribution Dpd.

It should be noted that an alternative is to calculate and acquire the lens component Dpl of each domain Dm each time the number of domain Dm divisions is changed.

2-1. Second Example

A second example of the second embodiment is configured such that the number of domain Dm divisions is changed on the basis of the difference in light intensity distribution between the reproduced image and the target image.

Figure 16:
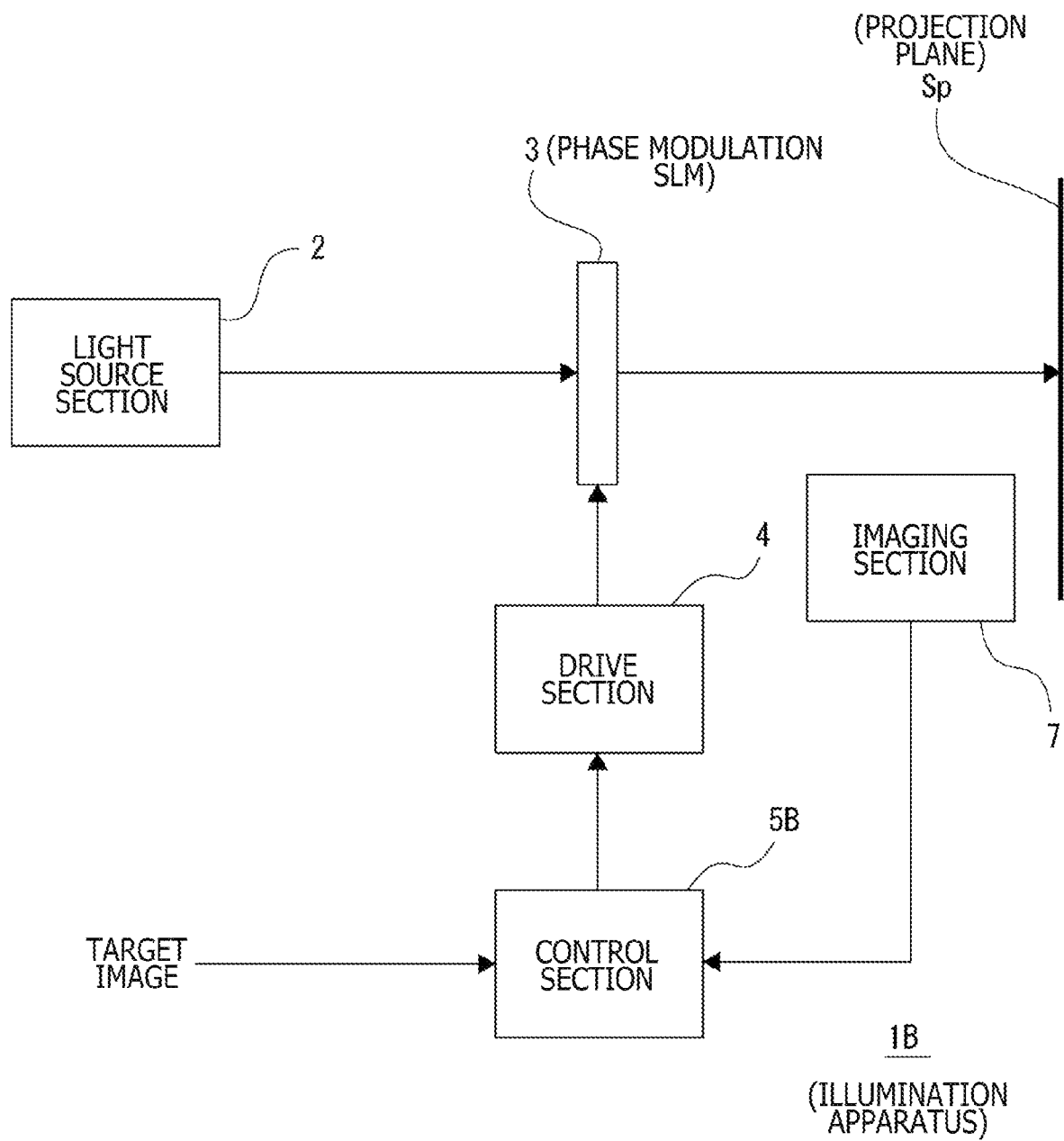
FIG. 16 is a diagram illustrating an example configuration of an illumination apparatus according to a second example of the second embodiment.

FIG. 16 is a diagram illustrating an example configuration of an illumination apparatus 1B according to the second example of the second embodiment.

The illumination apparatus 1B differs from the illumination apparatus 1 depicted in FIG. 1 in that an imaging section 7 is included, and that a control section 5B is included instead of the control section 5.

The imaging section 7 includes, for example, an imaging element such as a CCD (Charge Coupled Device) sensor or a CMOS (Complementary Metal Oxide Semiconductor) sensor, and captures the reproduced image that is projected on the projection plane Sp by the phase modulation SLM 3.

On the basis of the image captured by the imaging section 7, the control section 5B determines the difference between the light intensity distribution of the reproduced image and the light intensity distribution of the target image (target light intensity distribution), and changes the number of domain Dm divisions according to the determined difference in light intensity distribution. More specifically, the control section 5B performs processing indicated in FIG. 17.

Figure 17:
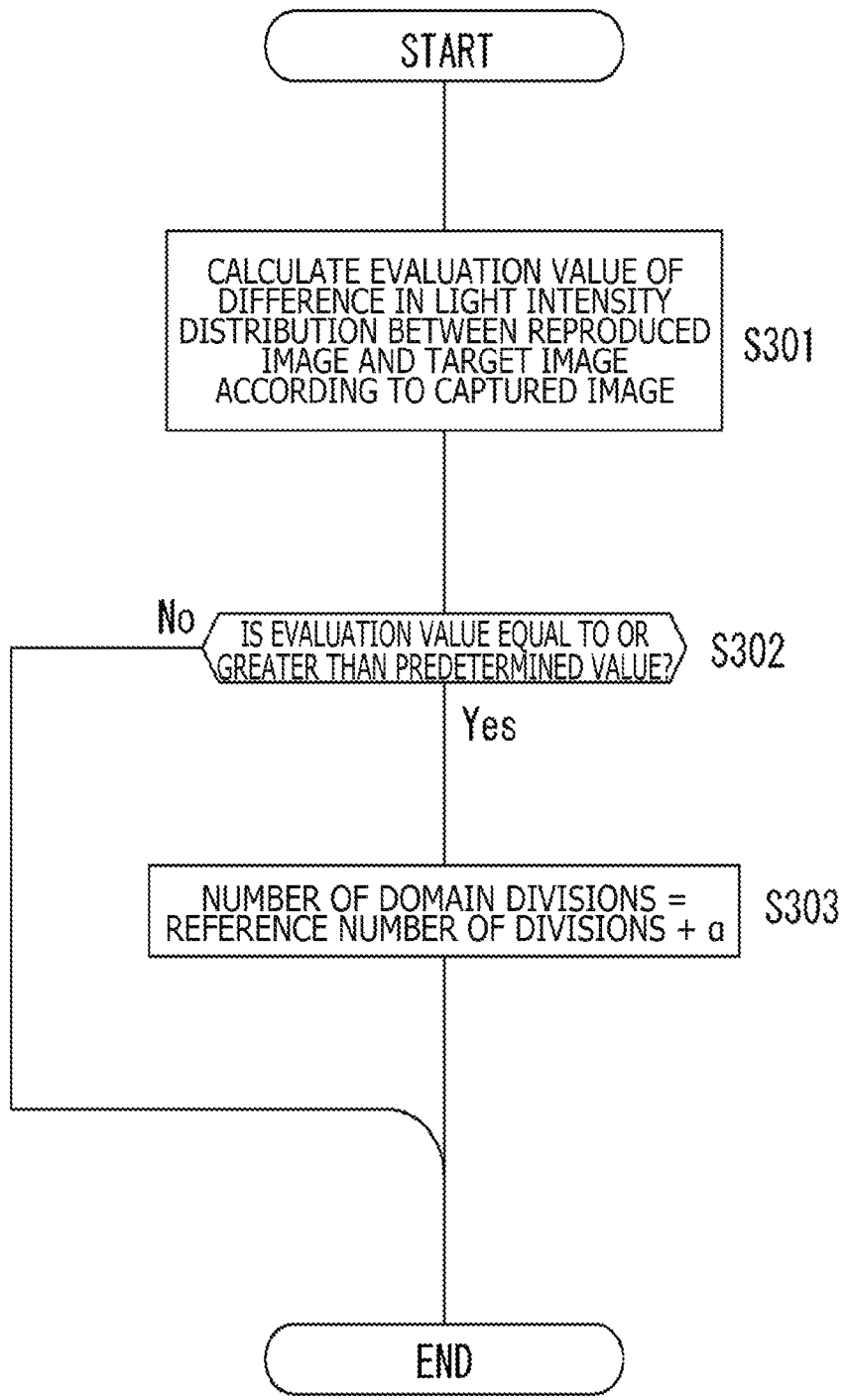
FIG. 17 is a flowchart illustrating an example of domain division processing according to the second example of the second embodiment.

FIG. 17 is a flowchart illustrating an example of domain division processing according to the second example of the second embodiment.

First of all, in step S301, the control section 5B calculates, on the basis of the captured image, an evaluation value of the difference in light intensity distribution between the reproduced image and the target image. It is assumed, for example, that the calculated evaluation value increases with an increase in the difference in light intensity distribution.

In step S302, which succeeds step S301, the control section 5B determines whether or not the evaluation value is equal to or greater than a predetermined value. In a case where it is determined that the evaluation value is smaller than the predetermined value (i.e., in a case where the difference in light intensity distribution is small), the control section 5B terminates the series of processing depicted in FIG. 17.

Meanwhile, in a case where it is determined that the evaluation value is equal to or greater than the predetermined value, the control section 5B proceeds to step S303, sets the number of domain divisions to a "reference number of divisions+a," and then terminates the series of processing depicted in FIG. 17.

This ensures that the number of domain Dm divisions is larger in a case where the difference in light intensity distribution between the reproduced image and the target image is great than in a case where the difference is small. As a result, the number of domain divisions can be adjusted in such a manner as to reduce the difference in light intensity distribution between the reproduced image and the target image.

It should be noted that, in the second example, the number of domain Dm divisions can be increased with an increase in the difference in light intensity distribution between the target image and the reproduced image.

Further, in the second example, the imaging section 7 need not always be integral with the illumination apparatus 1B, and may be disposed external to the illumination apparatus 1B.

3. Third Embodiment 3-1. Configuration of Projector Apparatus

A third embodiment is configured such that the illumination apparatus described thus far as an embodiment is applied to a projector apparatus.

Figure 18:
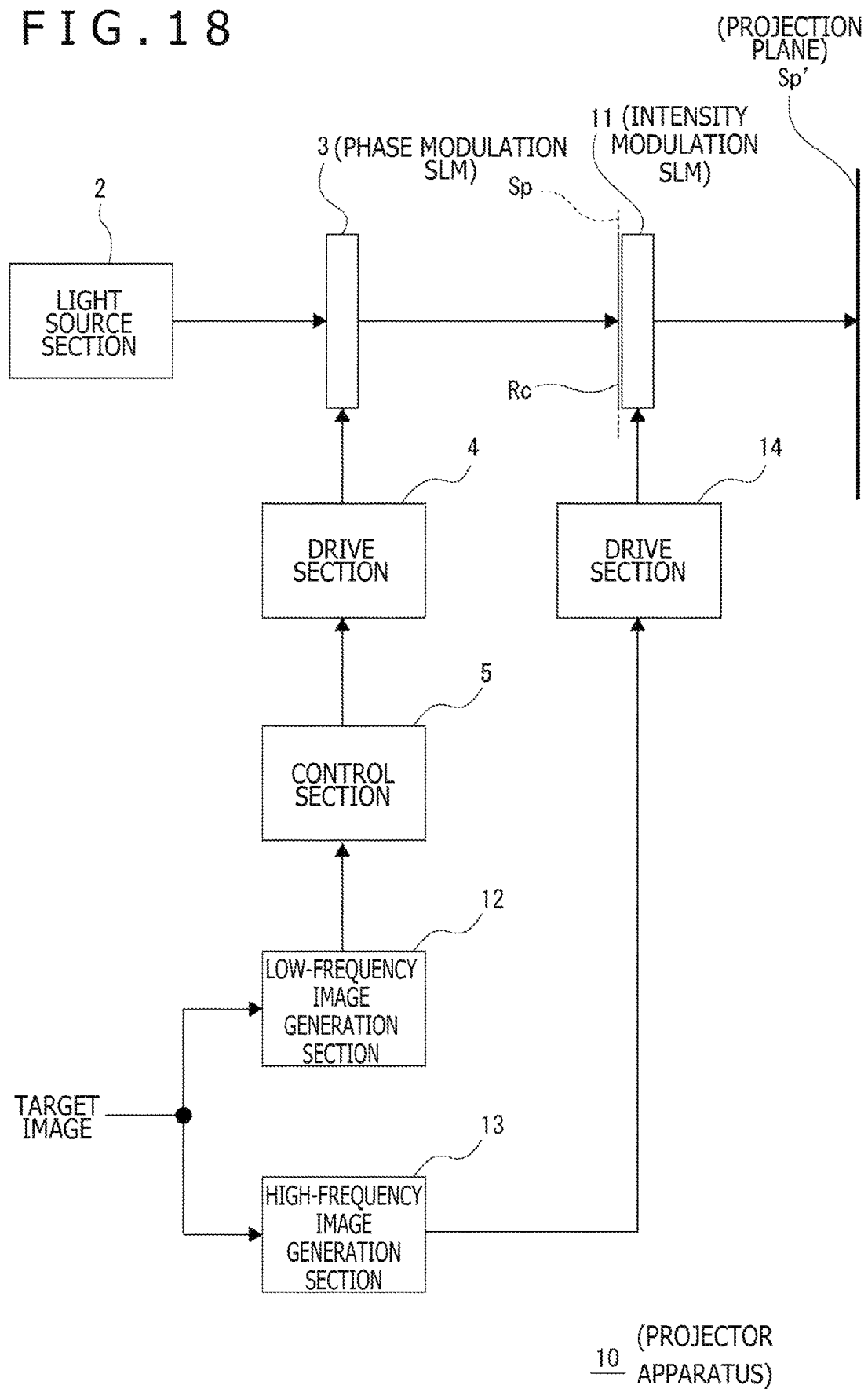
FIG. 18 is a diagram illustrating an example configuration of a projector apparatus to which the illumination apparatus according to an embodiment is applied.

FIG. 18 is a diagram illustrating an example configuration of a projector apparatus 10 to which the illumination apparatus according to an embodiment is applied.

As illustrated in FIG. 18, the projector apparatus 10 includes the light source section 2, the phase modulation SLM 3, the drive section 4, and the control section 5, as is the case with the illumination apparatus 1 depicted in FIG. 1, and additionally includes an intensity modulation SLM 11, a low-frequency image generation section 12, a high-frequency image generation section 13, and a drive section 14.

The intensity modulation SLM 11 includes, for example, a transmissive liquid crystal panel and performs spatial light intensity modulation on the incident light. As depicted in FIG. 18, the intensity modulation SLM 11 is connected to an output stage of the phase modulation SLM 3. Therefore, light emitted from the light source section 2 and subjected to spatial light phase modulation by the phase modulation SLM 3 is incident on the intensity modulation SLM 11.

The projector apparatus 10 projects the reproduced image of the target image on a projection plane Sp' by projecting the light subjected to spatial light intensity modulation by the intensity modulation SLM 11 on the projection plane Sp'.

It should be noted that, for example, a reflective spatial light phase modulator, such as a reflective liquid crystal panel or a DMD, can be used as the intensity modulation SLM 11.

The low-frequency image generation section 12 is configured as a low-pass filter for the target image and is adapted to extract low-frequency components of the target image and output the extracted low-frequency components to the control section 5 as a low-frequency image. In this case, the control section 5 uses the low-frequency image outputted from the low-frequency image generation section 12 as the target image to perform the processing according to the first embodiment as illustrated in FIG. 7 for the purpose of calculating the domain phase distribution Dpd of each domain Dm. Then, the control section 5 controls the drive section 4 in such a manner that spatial light phase modulation is performed according to the calculated domain phase distribution Dpd.

Here, as is obvious from the location of the depicted projection plane Sp, the phase distribution in this case is calculated by the Freeform method in such a manner as to reproduce the target image on an intensity modulation plane of the intensity modulation SLM 11. Further, the lens component Dpl of each domain Dm used in this case is obtained by performing calculations in such a manner as to reproduce the light intensity distribution of each domain Dm in the common region Rc on the projection plane Sp that is set in the intensity modulation plane of the intensity modulation SLM 11.

The high-frequency image generation section 13 is configured as a high-pass filter for the target image and is adapted to extract high-frequency components of the target image and output the extracted high-frequency components to the drive section 14 as a high-frequency image.

The drive section 14 drives each pixel in the intensity modulation SLM 11 according to an inputted high-frequency image.

Consequently, a light intensity distribution according to the high-frequency image is given to the light subjected to spatial light intensity modulation by the intensity modulation SLM 11.

3-2. Image Reproduction Method According to Third Embodiment

Incidentally, conventional projector apparatuses obtain the reproduced image by causing the intensity modulation SLM 11 to perform spatial light intensity modulation on the light from the light source. However, spatial light intensity modulation partially blocks or dims the light incident from the light source. Therefore, light utilization efficiency is low, and contrast enhancement is difficult to achieve.

In view of the above circumstances, the present embodiment is configured such that the illumination apparatus described in conjunction with the first and second embodiments, namely, the illumination apparatus adapted to perform spatial light phase modulation for reproducing a desired light intensity distribution, is applied to the projector apparatus 10 in order to improve light utilization efficiency and achieve contrast enhancement of the reproduced image.

According to the configuration depicted in FIG. 18, the phase modulation SLM 3 performs spatial light phase modulation to reproduce a light intensity distribution according to the low-frequency image of the target image in the common region Rc on the projection plane Sp, which is set in the intensity modulation plane of the intensity modulation SLM 11. This corresponds to the formation of an approximate light intensity distribution of the target image before spatial light intensity modulation by the intensity modulation SLM 11, and is similar to control exercised to provide what is generally called area division drive of the backlight of a liquid-crystal display. However, the light intensity distribution in this instance is formed by phase modulation. This prevents a decrease in the utilization efficiency of the light from the light source.

In the above case, the intensity modulation SLM 11 arranges details of the reproduced image of the low-frequency image, which is reproduced by the phase modulation SLM 3, and functions to reproduce a light intensity distribution according to the target image on the projection plane Sp'. This makes it possible to enhance the contrast of the reproduced image while suppressing a decrease in the resolution of the reproduced image.

As the method of spatial light phase modulation in the phase modulation SLM 3, the projector apparatus 10 depicted in FIG. 18 adopts a method of causing each domain Dm to reproduce a common light intensity distribution in a common region. Therefore, the light intensity distribution of incident light from the light source is prevented from being superimposed on the reproduced image on the projection plane Sp'. This improves the robustness of image reproduction on the projection plane Sp' against the incident light intensity distribution.

It should be noted that, although an illustrated description is not given here, the projector apparatus 10 may also perform a process of dynamically changing the number of domain Dm divisions as described in conjunction with the first and second examples of the second embodiment.

4. Modifications

Here, the present technology is not limited to above-described specific examples of the foregoing embodiments and can adopt configurations as various modifications.

For example, although an example of calculating the basic phase distribution Dpr by the Freeform method as needed is described above, a pre-calculated basic phase distribution Dpr can alternatively be used.

For example, in a case where the illumination apparatus 1 is applied, for instance, to a headlight, images (light intensity distributions) to be reproduced are limited in some cases. In such cases, an alternative is to store in advance, in a memory readable by the control section 5, information regarding a basic phase distribution Dpr pre-calculated for each image to be reproduced, read a relevant basic phase distribution Dpr from the memory at a time of reproduced-image changeover, and use the read information accordingly.

Further, in a case where the number of domain Dm divisions is fixed, the lens component Dpl for each domain Dm is fixed. Therefore, the domain phase distribution Dpd of each domain Dm can be pre-calculated for each image to be reproduced, with use of the fixed lens component Dpl. In this case, an alternative is to store in advance, in the memory, the pre-calculated domain phase distribution Dpd of each domain Dm for each image, read a relevant domain phase distribution Dpd from the memory at the time of reproduced-image changeover, and use the read information accordingly.

Figure 19:
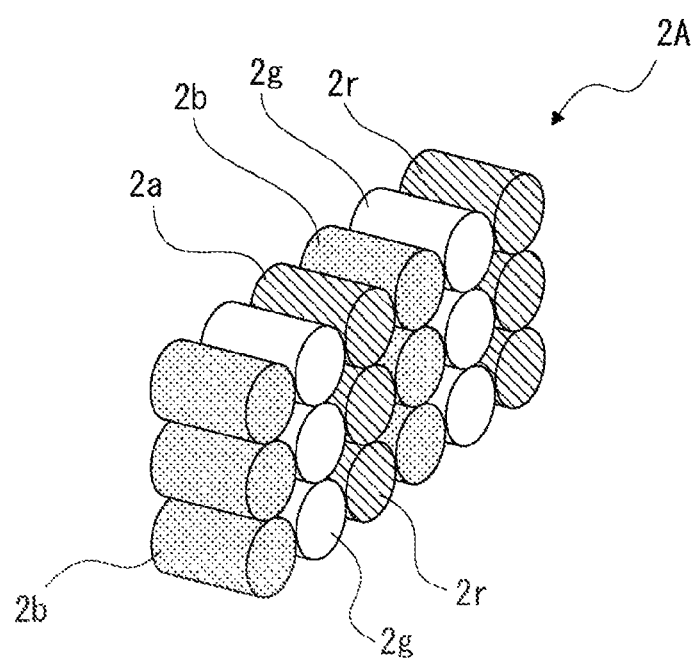
FIG. 19 is an explanatory diagram illustrating a light source section according to a modification.

Moreover, the light source section 2 to be used may alternatively be configured such that a plurality of light emitting elements 2r, 2g, and 2b of R (red), G (green), and B (blue) colors is arrayed, as is the case with the light source section 2A illustrated in FIG. 19. In this case, light emitted from these light emitting elements 2r, 2g, and 2b of the respective colors can be combined to achieve image reproduction by using white color.

In the above instance, the illumination apparatus and projector apparatus according to the embodiments use a refraction phenomenon for the purpose of image reproduction (refer, for example, to FIG. 3). This makes it possible to ignore a problem of wavelength selectivity, for example, in a case where image reproduction is achieved by using a diffraction phenomenon for generating a CGH (Computer-Generated Hologram). Therefore, even in a case where the employed light source section 2A includes an array of light emitting elements 2r, 2g, and 2b of the respective colors illustrated in FIG. 19, the light emitting elements 2r, 2g, and 2b need not emit light in a time-vision manner in consideration of wavelength selectivity. Further, unlike in the case of a three-plate type projector apparatus, an optical path and a spatial light modulator need not be divided into those for individual colors for configuration purposes.

5. Summary of Embodiments

As described above, the illumination apparatus (illumination apparatus 1, 1A, or 1B or projector apparatus 10) provided as an embodiment includes the light source section (light source section 2 or 2A), the phase modulation section (phase modulation SLM 3), and the control section (control section 5, 5A, or 5B). The light source section has light emitting elements (light emitting elements 2a, 2r, 2g, and 2b). The phase modulation section performs spatial light phase modulation on incident light from the light source section. The control section controls the phase modulation section in such a manner that a plurality of domains (domains Dm) formed by dividing a phase modulation plane of the phase modulation section reproduces a light intensity distribution based on a common phase distribution (common phase distribution Dpc) determined on the basis of the Freeform method in the common region (common region Rc) on the projection plane (projection plane Sp).

Since the plurality of domains reproduces the light intensity distribution based on the common phase distribution in the common region on the projection plane in this manner, the light intensity distribution reproduced in the common region represents one obtained by merging light intensity distributions by the individual domains. Therefore, even if the light intensity distribution of the incident light is uneven and non-uniform, the contributions from the individual domains are averaged in the projection plane. Consequently, the light intensity distribution of the reproduced image is unlikely to change.

Consequently, in a case where the light intensity distribution of the incident light is non-uniform, a non-uniform incident light intensity distribution is unlikely to be superimposed on the reproduced image. This improves robustness against the incident light intensity distribution.

When the robustness against the incident light intensity distribution is improved, the light source section does not need to emit light having a uniform intensity distribution. Therefore, the light source section can include an array of a plurality of light emitting elements. This results in cost reduction.

Additionally, even if the difference in light emission intensity between the light emitting elements becomes significant due to aging in a case where the employed light source section includes an array of light emitting elements, the influence on the reproduced image can be mitigated.

Further, the illumination apparatus provided as an embodiment is configured in such a manner that the light source section has a plurality of light emitting elements.

Therefore, the light source section does not need to use a single high-output light emitting element in order to satisfy predetermined light intensity requirements.

This reduces the cost of the light source section.

Further, the illumination apparatus provided as an embodiment is configured in such a manner that the control section uses, as the common phase distribution, the phase distribution that is obtained by performing the scaling process according to a domain size on the phase distribution calculated by the Freeform method.

This configuration eliminates the necessity of calculating the phase distribution of each domain by the Freeform method.

Consequently, it is possible to reduce the load on processing.

Moreover, the illumination apparatus provided as an embodiment is configured in such a manner that the control section assigns, as the phase distribution of each domain, the phase distribution obtained by adding a lens component (lens component Dpl) based on a domain location to the common phase distribution.

Consequently, the common light intensity distribution can properly be reproduced in the common region on the projection plane in a manner corresponding to a case where the common phase distribution is used for each domain.

As a result, the robustness against the incident light intensity distribution can be improved while reducing the load imposed on processing for phase distribution calculation.

Additionally, the illumination apparatus provided as an embodiment is configured in such a manner that the control section (control section 5A or 5B) dynamically changes the number of domain divisions.

Increasing the number of domain divisions improves the robustness against the incident light intensity distribution, and decreasing the number of domain divisions improves the resolution of the reproduced image.

Consequently, the balance between the robustness and the reproduced image resolution can be dynamically adjusted by dynamically changing the number of domain divisions.

Further, the illumination apparatus provided as an embodiment is configured in such a manner that the control section (control section 5A) changes the number of domain divisions according to the result of evaluation of uniformity of the incident light intensity distribution.

This configuration makes it possible to properly control the number of domain divisions according to the incident light intensity distribution, for example, by increasing the number of domain divisions to mitigate the influence of the incident light intensity distribution on the reproduced image in a case where the uniformity of the incident light intensity distribution is low, and by decreasing the number of domain divisions to improve the resolution of the reproduced image in a case where the uniformity of the incident light intensity distribution is high.

Consequently, the balance between the robustness against the incident light intensity distribution and the resolution of the reproduced image can properly be adjusted according to the incident light intensity distribution.

Further, the illumination apparatus provided as an embodiment is configured in such a manner that the control section exercises control to cause the number of domain divisions to be larger in a case where the uniformity is evaluated low than in a case where the uniformity is evaluated high.

This configuration makes it possible to mitigate the influence of the incident light intensity distribution on the reproduced image by increasing the number of domain divisions in a case where the uniformity of the incident light intensity distribution is low, and improve the resolution of the reproduced image by decreasing the number of domain divisions in a case where the uniformity of the incident light intensity distribution is high.

Consequently, the balance between the robustness against the incident light intensity distribution and the resolution of the reproduced image can properly be adjusted according to the incident light intensity distribution.

Moreover, the illumination apparatus provided as an embodiment is configured in such a manner that the control section causes the number of divisions to increase with a decrease in the level of evaluation of uniformity.

This configuration ensures that the effect of mitigating the influence of the incident light intensity distribution on the reproduced image increases with a decrease in the uniformity of the incident light intensity distribution.

Consequently, it is possible to properly mitigate the influence of the incident light intensity distribution on the reproduced image.

Additionally, the illumination apparatus provided as an embodiment is configured in such a manner that the light source section has a plurality of light emitting elements, and that the control section evaluates the uniformity depending on whether or not non-luminous light emitting elements are detected in the light source section.

This configuration makes it possible to evaluate the uniformity of the incident light intensity distribution according to the result of detection of the conduction state of the light emitting elements.

Consequently, the configuration of the detection section for uniformity evaluation can be simplified to reduce the number and cost of parts.

Further, the illumination apparatus provided as an embodiment is configured in such a manner that the control section (control section 5B) determines, on the basis of the image captured of the projection plane, the difference between the light intensity distribution of the reproduced image on the projection plane and the target light intensity distribution, and changes the number of domain divisions according to the determined difference.

This configuration makes it possible to adjust the number of domain divisions in such a manner as to reduce the difference between the light intensity distribution of the reproduced image and the target light intensity distribution.

Consequently, the robustness against the incident light intensity distribution can be improved.

Further, the illumination method provided as an embodiment is the illumination method performed by an illumination apparatus including a light source section and a phase modulation section. The light source section has a light emitting element. The phase modulation section performs spatial light phase modulation on incident light from the light source section. The illumination method controls the phase modulation section in such a manner that a plurality of domains formed by dividing a phase modulation plane of the phase modulation section reproduces a light intensity distribution based on a common phase distribution determined on the basis of the Freeform method in a common region on a projection plane.

The above-described illumination method provided as an embodiment also makes it possible to provide operations and advantages similar to those provided by the above-described illumination apparatus provided as an embodiment.

Moreover, the projector apparatus (projector apparatus 10) provided as an embodiment includes a light source section, a phase modulation section, an intensity modulation section (intensity modulation SLM 11), and a control section (control section 5). The light source section has a light emitting element. The phase modulation section performs spatial light phase modulation on incident light from the light source section. The intensity modulation section performs spatial light intensity modulation on the light that is subjected to spatial light phase modulation by the phase modulation section. The control section controls the phase modulation section in such a manner that a plurality of domains formed by dividing a phase modulation plane of the phase modulation section reproduces a light intensity distribution based on a common phase distribution determined on the basis of the Freeform method in a common region on an intensity modulation plane of the intensity modulation section.

Accordingly, the projector apparatus, which includes the phase modulation section to improve light utilization efficiency of the light incident from the light source section, is able to ensure that the light intensity distribution of a reproduced image is unlikely to change even if the light intensity distribution of the incident light with respect to the phase modulation section is uneven and non-uniform.

Consequently, the robustness against the incident light intensity distribution can be improved while enhancing the contrast of the reproduced image.

It should be noted that advantages described in this document are merely illustrative and not restrictive. The present technology may additionally provide advantages other than those described in this document.

6. Present Technology

It should be noted that the present technology can also adopt the following configurations.

(1)

An illumination apparatus including:
a light source section that has a light emitting element;
a phase modulation section that performs spatial light phase modulation on incident light from the light source section; and
a control section that controls the phase modulation section in such a manner that a plurality of domains formed by dividing a phase modulation plane of the phase modulation section reproduces a light intensity distribution based on a common phase distribution determined on the basis of a Freeform method in a common region on a projection plane.

(2)

The illumination apparatus as described in (1) above, in which the light source section includes a plurality of light emitting elements.

(3)

The illumination apparatus as described in (1) or (2) above, in which the control section uses, as the common phase distribution, a phase distribution that is obtained by performing a scaling process according to sizes of the domains on a phase distribution calculated by the Freeform method.

(4)

The illumination apparatus as described in (3) above, in which the control section assigns, as the phase distribution of each of the domains, a phase distribution obtained by adding a lens component based on a domain location to the common phase distribution.

(5)

The illumination apparatus as described in any one of (1) to (4) above, in which the control section dynamically changes the number of domain divisions.

(6)

The illumination apparatus as described in (5) above, in which the control section changes the number of domain divisions according to a result of evaluation of uniformity of the light intensity distribution of the incident light.

(7)

The illumination apparatus as described in (6) above, in which, in a case where the uniformity is evaluated low, the control section provides a larger number of domain divisions than in a case where the uniformity is evaluated high.

(8)

The illumination apparatus as described in (7) above, in which the control section increases the number of domain divisions when a level of evaluation of the uniformity decreases.

(9)

The illumination apparatus as described in any one of (6) to (8) above, in which the light source section has a plurality of light emitting elements, and the control section evaluates the uniformity depending on whether or not non-luminous light emitting elements are detected in the light source section.

(10)

The illumination apparatus as described in any one of (5) to (9) above, in which the control section determines, on the basis of a captured image of the projection plane, a difference between a light intensity distribution of a reproduced image on the projection plane and a target light intensity distribution and changes the number of domain divisions according to the determined difference.

(11)

An illumination method that is performed by an illumination apparatus including a light source section and a phase modulation section, the light source section having a light emitting element, the phase modulation section performing spatial light phase modulation on incident light from the light source section, the illumination method including:

controlling the phase modulation section in such a manner that a plurality of domains formed by dividing a phase modulation plane of the phase modulation section reproduces a light intensity distribution based on a common phase distribution determined on the basis of a Freeform method in a common region on a projection plane.

(12)

A projector apparatus including:

a light source section that has a light emitting element;

a phase modulation section that performs spatial light phase modulation on incident light from the light source section;

an intensity modulation section that performs spatial light intensity modulation on the light subjected to spatial light phase modulation by the phase modulation section; and a control section that controls the phase modulation section in such a manner that a plurality of domains formed by dividing a phase modulation plane of the phase modulation section reproduces a light intensity distribution based on a common phase distribution determined on the basis of a Freeform method in a common region on an intensity modulation plane of the intensity modulation section.

REFERENCE SIGNS LIST 1, 1A, 1B: Illumination apparatus
2, 2A: Light source section
2a, 2r, 2g, 2b: Light emitting element
3: Phase modulation SLM
4, 14: Drive section
5, 5A, 5B: Control section
6: Non-luminous element detection section
7: Imaging section
Sp, Sp': Projection plane
Sm: Phase modulation plane
Dm, Dm-1, Dm-2, Dm-3: Domain
Rc: Common region
Oa: Shield
Ar: Basic region
Dpr: Basic phase distribution
Dpc: Common phase distribution
Dpd: Domain phase distribution
Tar, Tas: Tangent
Dpl, Dpl-1, Dpl-2, Dpl-3: Lens component
10: Projector apparatus
11: Intensity modulation SLM
12: Low-frequency image generation section
13: High-frequency image generation section

What is claimed is:

1. An illumination apparatus, comprising:

a light source section that has a light emitting element;

a phase modulation section that performs spatial light phase modulation on incident light from the light source section; and a control section that controls the phase modulation section in such a manner that a plurality of domains formed by dividing a phase modulation plane of the phase modulation section reproduces a light intensity distribution based on a common phase distribution determined on a basis of a Freeform method in a common region on a projection plane, wherein the control section uses, as the common phase distribution, a phase distribution that is obtained by performing a scaling process according to sizes of the domains on a phase distribution calculated by the Freeform method.

2. The illumination apparatus according to claim 1, wherein the light source section includes a plurality of light emitting elements.

3. The illumination apparatus according to claim 1, wherein the control section assigns, as the phase distribution of each of the domains, a phase distribution obtained by adding a lens component based on a domain location to the common phase distribution.

4. An illumination apparatus, comprising:
a light source section that has a light emitting element;
a phase modulation section that performs spatial light phase modulation on incident light from the light source section; and
a control section that controls the phase modulation section in such a manner that a plurality of domains formed by dividing a phase modulation plane of the phase modulation section reproduces a light intensity distribution based on a common phase distribution determined on a basis of a Freeform method in a common region on a projection plane, wherein the control section dynamically changes a number of domain divisions.

5. The illumination apparatus according to claim 4, wherein the control section uses, as the common phase distribution, a phase distribution that is obtained by performing a scaling process according to sizes of the domains on a phase distribution calculated by the Freeform method.

6. The illumination apparatus according to claim 5, wherein the control section assigns, as the phase distribution of each of the domains, a phase distribution obtained by adding a lens component based on a domain location to the common phase distribution.

7. The illumination apparatus according to claim 5, wherein the control section changes the number of domain divisions according to a result of evaluation of uniformity of the light intensity distribution of the incident light.

8. The illumination apparatus according to claim 7, wherein, in a case where the uniformity is evaluated low, the control section provides a larger number of domain divisions than in a case where the uniformity is evaluated high.

9. The illumination apparatus according to claim 7,
wherein the light source section has a plurality of light emitting elements, and
the control section evaluates the uniformity depending on whether or not non-luminous light emitting elements are detected in the light source section.

10. The illumination apparatus according to claim 8, wherein the control section increases the number of domain divisions when a level of evaluation of the uniformity decreases.

11. The illumination apparatus according to claim 5, wherein the control section determines, on a basis of a captured image of the projection plane, a difference between a light intensity distribution of a reproduced image on the projection plane and a target light intensity distribution and changes the number of domain divisions according to the determined difference.

12. The illumination apparatus according to claim 4, wherein the control section changes the number of domain divisions according to a result of evaluation of uniformity of the light intensity distribution of the incident light.

13. The illumination apparatus according to claim 12, wherein, in a case where the uniformity is evaluated low, the control section provides a larger number of domain divisions than in a case where the uniformity is evaluated high.

14. The illumination apparatus according to claim 13, wherein the control section increases the number of domain divisions when a level of evaluation of the uniformity decreases.

15. The illumination apparatus according to claim 12,
wherein the light source section has a plurality of light emitting elements, and
the control section evaluates the uniformity depending on whether or not non-luminous light emitting elements are detected in the light source section.

16. The illumination apparatus according to claim 4, wherein the control section determines, on a basis of a captured image of the projection plane, a difference between a light intensity distribution of a reproduced image on the projection plane and a target light intensity distribution and changes the number of domain divisions according to the determined difference.

17. The illumination apparatus according to claim 4, wherein the light source section includes a plurality of light emitting elements.

* * * * *